United States Patent [19]
Vorbach et al.

[11] Patent Number: 6,088,795
[45] Date of Patent: Jul. 11, 2000

[54] PROCESS FOR AUTOMATIC DYNAMIC RELOADING OF DATA FLOW PROCESSORS (DFPS) AND UNITS WITH TWO OR THREE-DIMENSIONAL PROGRAMMABLE CELL ARCHITECTURES (FPGAS, DPGAS AND THE LIKE)

[75] Inventors: Martin Vorbach; Robert Münch, both of Karlsruhe, Germany

[73] Assignee: PACT GmbH, Munich, Germany

[21] Appl. No.: 08/947,002

[22] Filed: Oct. 8, 1997

[51] Int. Cl.[7] .................................................. G06F 9/445
[52] U.S. Cl. .................................. 713/100; 713/1; 712/15
[58] Field of Search .................................. 713/1, 100, 2; 712/220, 223, 16, 10, 14, 15, 20; 326/38; 307/465; 327/108; 709/221; 714/3, 7; 395/500, 500.07

[56] References Cited

U.S. PATENT DOCUMENTS

| | | |
|---|---|---|
| Re. 34,363 | 8/1993 | Freeman . |
| 4,706,216 | 11/1987 | Carter . |
| 4,739,474 | 4/1988 | Holsztynski et al. . |

(List continued on next page.)

FOREIGN PATENT DOCUMENTS

| | | |
|---|---|---|
| 0 221 360 | 5/1987 | European Pat. Off. . |
| 0428327A1 | 5/1991 | European Pat. Off. . |
| 748 051 A2 | 12/1991 | European Pat. Off. . |
| 0539595A1 | 5/1993 | European Pat. Off. . |
| 0 678 985 | 10/1995 | European Pat. Off. . |
| 0 726 532 | 8/1996 | European Pat. Off. . |
| 735 685 | 10/1996 | European Pat. Off. . |
| 4416881 | 11/1994 | Germany . |
| WO90/11648 | 10/1990 | WIPO . |
| 94/08399 | 4/1994 | WIPO . |

OTHER PUBLICATIONS

Villasenor, John, et al., "Configurable Computing." *Scientific American*, vol. 276, No. 6, Jun. 1997, pp. 66–71.

Villasenor, John, et al., "Configurable Computing Solutions for Automatic Target Recognition," *IEEE*, 1996 pp. 70–79.

Tau, Edward, et al., "A First Generation DPGA Implementation," *FPD '95*, pp. 138–143.

Athanas, Peter, et al., "IEEE Symposium on FPGAs for Custom Computing Machines," *IEEE Computer Society Press*, Apr. 19–21, 1995, pp. i–vii, 1–222.

Bittner, Ray, A., Jr., "Wormhole Run–Time Reconfiguration: Conceptualization and VLSI Design of a High Performance Computing system," *Dissertation*, Jan. 23, 1997, pp. i–xx, 1–415.

(List continued on next page.)

*Primary Examiner*—Dennis M. Butler
*Assistant Examiner*—Rijue Mai
*Attorney, Agent, or Firm*—Kenyon & Kenyon

[57] ABSTRACT

A method for processing data in a configurable unit having a multidimensional cell arrangement a switching table is provided, the switching table including a controller and a configuration memory. Configuration strings are transmitted from the switching table to a configurable element of the unit to establish a valid configuration. A configurable element writes data into the configuration memory. The controller of the switching table recognizes individual records as commands and may execute the recognized commands. The controller may also recognize and differentiate between events and execute a action in response thereto. In response to an event, the controller may move the position of a pointer, and if it has received configuration data rather than commands for the controller, sends the configuration data to the configurable element defined in the configuration data. The controller may send a feedback message to the configurable element. The configurable element may recognize and analyze the feedback message. An configurable element may transmit data into the configuration memory of the switching table.

49 Claims, 21 Drawing Sheets

U.S. PATENT DOCUMENTS

| | | |
|---|---|---|
| 4,761,755 | 8/1988 | Ardini et al. . |
| 4,811,214 | 3/1989 | Nosenchuck et al. . |
| 4,870,302 | 9/1989 | Freeman . |
| 4,901,268 | 2/1990 | Judd . |
| 4,967,340 | 10/1990 | Dawes . |
| 5,014,193 | 5/1991 | Garner et al. . |
| 5,015,884 | 5/1991 | Agrawal et al. . |
| 5,021,947 | 6/1991 | Campbell et al. . |
| 5,023,775 | 6/1991 | Poret . |
| 5,068,823 | 11/1991 | Robinson ............................... 395/500 |
| 5,081,375 | 1/1992 | Pickett et al. . |
| 5,109,503 | 4/1992 | Cruickshank et al. . |
| 5,123,109 | 6/1992 | Hillis . |
| 5,125,801 | 6/1992 | Nabity et al. . |
| 5,128,559 | 7/1992 | Steele . |
| 5,142,469 | 8/1992 | Weisenborn . |
| 5,204,935 | 4/1993 | Mihara et al. . |
| 5,208,491 | 5/1993 | Ebeling et al. . |
| 5,226,122 | 7/1993 | Thayer et al. . |
| 5,233,539 | 8/1993 | Agrawal et al. . |
| 5,247,689 | 9/1993 | Ewert . |
| 5,287,472 | 2/1994 | Horst . |
| 5,301,344 | 4/1994 | Kolchinsky . |
| 5,303,172 | 4/1994 | Magar et al. . |
| 5,329,180 | 7/1994 | Popli et al. ............................ 307/465 |
| 5,336,950 | 8/1994 | Popli et al. . |
| 5,349,193 | 9/1994 | Mott et al. ......................... 250/370.06 |
| 5,361,373 | 11/1994 | Gilson . |
| 5,418,952 | 5/1995 | Morley et al. . |
| 5,421,019 | 5/1995 | Holsztynski et al. . |
| 5,422,823 | 6/1995 | Agrawal et al. . |
| 5,426,378 | 6/1995 | Ong . |
| 5,430,687 | 7/1995 | Hung et al. . |
| 5,440,245 | 8/1995 | Galbraith et al. . |
| 5,442,790 | 8/1995 | Nosenchuck . |
| 5,444,394 | 8/1995 | Watson et al. . |
| 5,448,186 | 9/1995 | Kawata . |
| 5,455,525 | 10/1995 | Ho et al. . |
| 5,457,644 | 10/1995 | McCollum . |
| 5,473,266 | 12/1995 | Ahanin et al. . |
| 5,473,267 | 12/1995 | Stansfield . |
| 5,475,583 | 12/1995 | Bock et al. . |
| 5,475,803 | 12/1995 | Stearns et al. . |
| 5,483,620 | 1/1996 | Pechanek et al. . |
| 5,485,103 | 1/1996 | Pedersen et al. . |
| 5,485,104 | 1/1996 | Agrawal et al. . |
| 5,489,857 | 2/1996 | Agrawal et al. . |
| 5,491,353 | 2/1996 | Kean . |
| 5,493,239 | 2/1996 | Zlotnick . |
| 5,497,498 | 3/1996 | Taylor . |
| 5,506,998 | 4/1996 | Kato et al. . |
| 5,510,730 | 4/1996 | El Gamal et al. . |
| 5,511,173 | 4/1996 | Yamaura et al. . |
| 5,513,366 | 4/1996 | Agarwal et al. . |
| 5,521,837 | 5/1996 | Frankle et al. . |
| 5,522,083 | 5/1996 | Gove et al. . |
| 5,532,693 | 7/1996 | Winters et al. . |
| 5,532,957 | 7/1996 | Malhi . |
| 5,535,406 | 7/1996 | Kolchinsky . |
| 5,537,057 | 7/1996 | Leong et al. . |
| 5,537,601 | 7/1996 | Kimura et al. . |
| 5,541,530 | 7/1996 | Cliff et al. . |
| 5,544,336 | 8/1996 | Kato et al. . |
| 5,548,773 | 8/1996 | Kemney et al. . |
| 5,555,434 | 9/1996 | Carlstedt . |
| 5,559,450 | 9/1996 | Nagi et al. . |
| 5,561,738 | 10/1996 | Kinerk et al. . |
| 5,570,040 | 10/1996 | Lytle et al. . |
| 5,583,450 | 12/1996 | Trimberger et al. . |
| 5,586,044 | 12/1996 | Agrawal et al. . |
| 5,587,921 | 12/1996 | Agrawal et al. . |
| 5,588,152 | 12/1996 | Dapp et al. . |
| 5,590,345 | 12/1996 | Barker et al. . |
| 5,594,698 | 1/1997 | Freeman ................................ 365/222 |
| 5,600,271 | 2/1997 | Erickson ................................ 327/108 |
| 5,687,348 | 11/1997 | Whittaker ............................... 395/460 |
| 5,760,602 | 6/1998 | Tan ........................................... 326/38 |
| 5,859,544 | 1/1999 | Norman .................................... 326/40 |
| 5,943,242 | 8/1999 | Vorbach et al. ................... 395/500.09 |
| 5,963,746 | 10/1999 | Barker et al. ............................. 712/20 |

OTHER PUBLICATIONS

Myers, G., Advances in Computer Architecture, Wiley–Interscience Publication, 2nd ed., John Wiley & Sons, Inc. pp. 463–94, 1978.

M. Saleeba, "A Self–Contained Dynamically Reconfigurable Processor Architecture", Sixteenth Australian Computer Science Conference, ASCS–16, QLD, Australia, Feb., 1993.

M. Morris Mano, "Digital Design," by Prentice Hall, Inc., Englewood Cliffs, New Jersey 07632, 1984, pp. 119–125, 154–161.

Maxfield, C. "Logic that Mutates While–U–Wait" EDN (Bur. Ed) (USA), EDN (European Edition), Nov. 7, 1996, Cahners Publishing, USA.

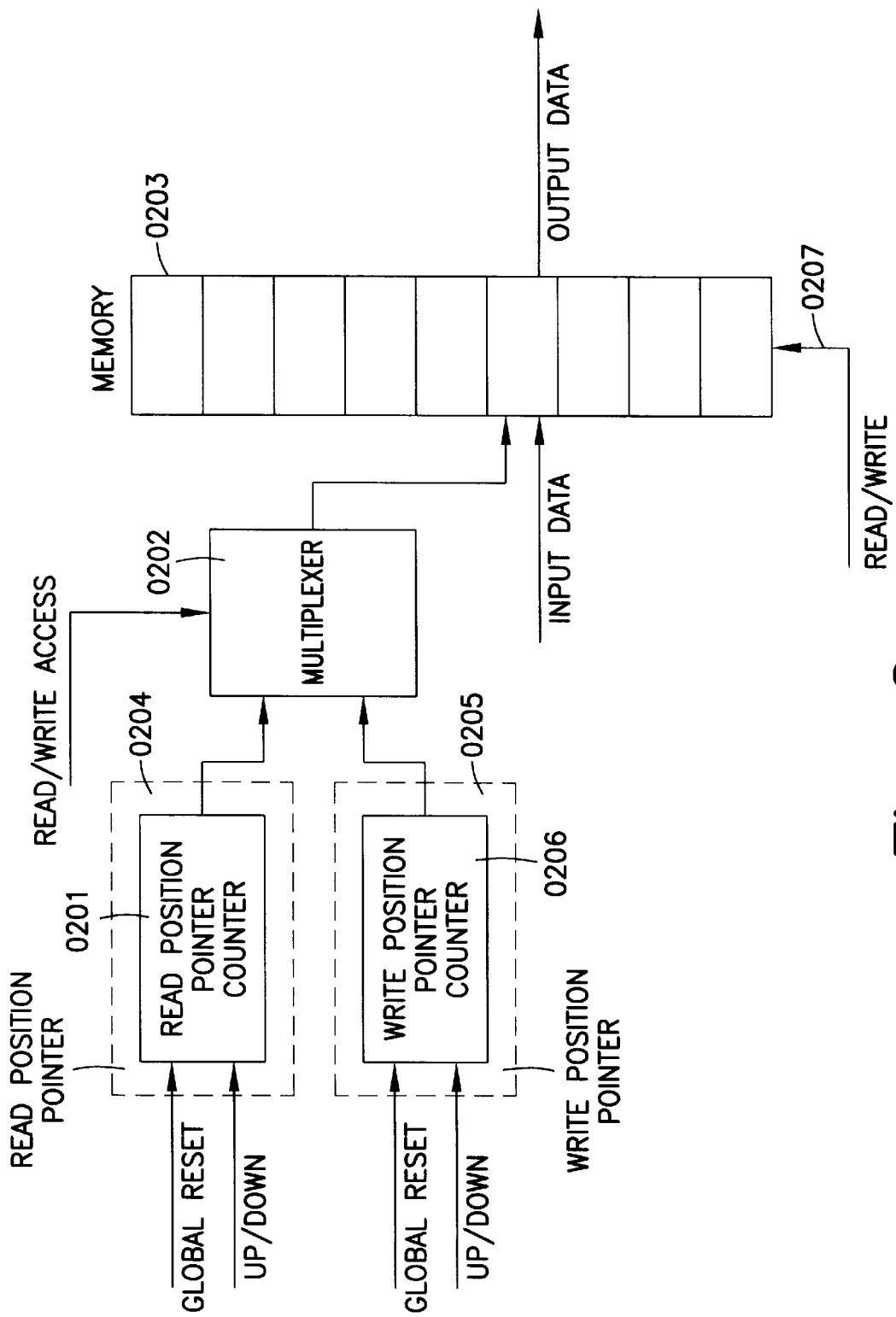

PROCESS FOR AUTOMATIC DYNAMIC RELOADING OF DATA FLOW PROCESSORS (DFPS) AND UNITS WITH TWO OR THREE-DIMENSIONAL PROGRAMMABLE CELL ARCHITECTURES (FPGAS, DPGAS AND THE LIKE)

FIELD OF THE INVENTION

The present invention is directed to a process for automatic dynamic reloading of data flow processors.

BACKGROUND INFORMATION

Programmable units presently used (DFPs, FPGAs—Field Programmable Gate Arrays) can be programmed in two different ways:

one-time only, i.e., the configuration can no longer be changed after programming. All configured elements of the unit perform the same function over the entire period during which the application takes place.

on site, i.e., the configuration can be changed after the unit has been installed by loading a configuration file when the application is started. Most units (in particular FPGA units) cannot be reconfigured during operation. For reconfigurable units, data usually cannot be further processed while the unit is being reconfigured, and the time required is very long.

Configuration data is loaded into programmable units through a hardware interface. This process is slow and usually requires hundreds of milliseconds due to the limited band width accessing the external memory where the configuration data is stored, after which the programmable unit is available for the desired/programmed function as described in the configuration file.

A configuration is obtained by entering a special bit pattern of any desired length into the configurable elements of the unit. Configurable elements can be any type of RAM cells, multiplexers, interconnecting elements or ALUs. A configuration string is stored in such an element, so that the element preserves its configuration determined by the configuration string during the period of operation.

The existing methods and options present a series of problems, such as:

If a configuration in a DFP (see German Patent Application No. DE 44 16 881 A1) or an FPGA is to be modified, a complete configuration file must always be transmitted to the unit to be programmed, even if only a very small part of the configuration is to be modified.

As a new configuration is being loaded, the unit can only continue to process data to a limited extent or not at all.

With the increasing number of configurable elements in each unit (in particular in FPGA units), the configuration files of these units also become increasingly large (several hundred Kbytes on average) Therefore it takes a very long time to configure a large unit and often makes it impossible to do it during operation or affects the function of the unit.

When a unit is partially configured during operation, a central logic entity is always used, through which all reconfigurations are managed. This requires considerable communication and synchronization resources.

SUMMARY OF THE INVENTION

The present invention makes it possible to reconfigure a programmable unit considerably more rapidly. The present invention allows different configurations of a programmable unit to be used in a flexible manner during operation without affecting or stopping the operability of the programmable unit. Unit configuration changes are performed simultaneously, so they are rapidly available without need for additional configuration data to be occasionally transmitted. The method can be used with all types of configurable elements of a configurable unit and with all types of configuration data, regardless of the purpose for which they are provided within the unit.

The present invention makes it possible to overcome the static limitations of conventional units and to improve the utilization of existing configurable elements. By introducing a buffer storage device, a plurality of different functions can be performed on the same data.

In a programmable unit, there is a plurality of ring memories, i.e., memories with a dedicated address control, which, upon reaching the end of the memory, continues at the starting point, thus forming a ring. These ring memories have read-write access to configuration registers, i.e., the circuits that receive the configuration data, of the elements to be configured. Such a ring memory has a certain number of records, which are loaded with configuration data by a PLU as described in German Patent Application No. 44 16 881 A1. The architecture of the records is selected so that their data format corresponds to the configurable element(s) connected to the ring memory and allows a valid configuration to be set.

Furthermore, there is a read position pointer, which selects one of the ring memory records as the current read record. The read position pointer can be moved to any desired position/record within the ring memory using a controller. Furthermore there is a write position pointer, which selects one of the ring memory records as the current write record. The write position pointer can be moved to any desired position/record within the ring memory using a controller.

At run time, to perform reconfiguration, a configuration string can be transmitted into the element to be configured without the data requiring management by a central logic or transmission. By using a plurality of ring memories, several configurable elements can be configured simultaneously.

Since a ring memory with its complete controller can switch configurable cells between several configuration modes, it is referred to as a switching table.

BRIEF DESCRIPTION OF THE DRAWINGS

FIG. 2 illustrates the internal architecture of a ring memory.

DETAILED DESCRIPTION OF THE INVENTION

Figure 1:
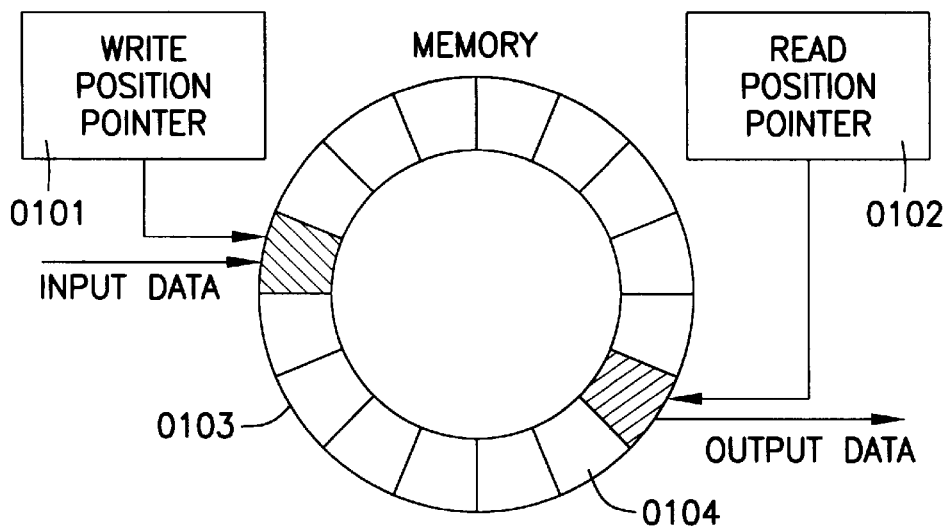
FIG. 1 illustrates a schematic architecture of a ring memory.

According to the present invention, a plurality of ring memories are provided in a programmable unit or connected externally to said unit. The one or more ring memories have one or more controllers controlling the one or more ring memories. These controllers are part of the PLU named in German Patent Application No. DE 44 16 881 A1. The ring memories contain configuration strings for the configurable elements of one or a plurality of configurable units; the configurable elements can also be expressly used for interconnecting function groups and they can be crossbar circuits or multiplexers for interconnecting bus architectures, which are conventional.

Ring memories and ring memory controllers can be either directly hardware-implemented or first obtained by configuring one or more configurable cells of a configurable unit (e.g., FPGA).

Conventional ring memories can be used as ring memories, in particular ring memories and/or controllers with the following properties:

where not all records are used, and which have the capability of providing a position where the read and/or write position pointer of the ring memory is set to the beginning or the end of the ring memory.

This can be implemented, for example, by using command strings (STOP, GOTO, etc.), counters, or registers storing the start and stop positions;

which make it possible to divide the ring memory into independent sections, and the controller of the ring memory can be set, for example, via the events listed below as examples, so that it works on one of these sections;

which make it possible to divide the ring memory into independent sections and there is a plurality of controllers, each one working on one section; a plurality of controllers may work on the same section. This can be implemented via arbiter switching, in which case certain processing cycles are lost. Registers can also be used instead of RAMs;

each controller has one or more read position pointers and/or one or more write position pointers;

this position pointer can be moved forward and/or backward;

this position pointer can be set to the start, end, or a given position on the basis of one or more events;

the controller has a mask register with which a subset can be selected from the set of all possible events by entering a data string. Only this subset of results is relayed to the controller as an event and triggers the forwarding of the position pointer(s);

controllers working with a multiple of the actual system clock rate (oversamnpling) to allow the processing of several records within a system cycle.

The switching table controller is implemented using a regular state machine. In addition to simple controllers required by a conventional ring memory, controllers with the following properties are best suited for performing or possibly expanding the control of the switching tables of a programmable unit (in particular also of FPGAs and DPGAs (Dynamically Programmable Gate Arrays, a new subgroup of FPGAs)) according to the present invention:

controllers capable of recognizing specific command strings. A command string is distinguished by the fact that it has an identifier, which allows the controller to recognize the data of a ring memory record as a command string rather than a data string;

controllers capable of executing specific command strings; specifically commands that change the sequence of the state machine and/or modify records of the ring memory through a data processing function;

controllers capable of recognizing an identifier and of processing additional records of the ring memory through the internal, higher-speed cycle (oversampling) on the basis of this identifier, until an end identifier is reached, or the next cycle of the clock that controls the oversampling cycle is reached.

In particular the following commands or a subset of those commands can be used as command strings for the appropriate control of a switching table requiring command string control. The command strings concerning position pointers can be used on the read position pointer(s) or on the write position pointer(s). Possible command strings include:

a WAIT command.

The WAIT command causes the controller to wait until the next event or (possibly several) events occur. During this state, the read/write position pointer(s) is(are) not moved. If the event(s) occur(s), the read/write position pointer(s) is (are) positioned on the next record.

a SKIP command.

The SKIP command causes a given number of ring memory records to be skipped by one of the following two methods:

The SKIP1 command is executed fully in a single processing cycle. If, for example, SKIP 5 is issued, the pointer jumps to the record located five records before (after) the current read/write record in a processing cycle.

The SKIP2 command is only executed after a number of processing cycles. It is conceivable, for example, that the SKIP 5 command is executed only after five processing cycles. Here again five records are skipped counting from the current record. The parameter (in this case the 5) is thus used twice.

The indication of the direction of jump can end either in a forward movement or in a backward movement of the position pointer with the use of a positive or negative number.

A SWAP command.

The SWAP command swaps the data of two given records.

A RESET command.

The RESET command sets the read/write position pointer(s) to the start and/or a given record position within the ring memory.

A WAIT-GOTO command.

The WAIT-GOTO command waits like the above-described WAIT command for one or more specific events and then positions the read/write position pointer to a specific start state within one or more processing cycles.

A NOP command.

The NOP command executes no action. No data is transmitted from the ring memory to the element(s) to be configured, neither are the position pointers modified. Thus the NOP command identifies a record as non-relevant. However, this record is addressed and evaluated by the ring memory controller it requires using one or more processing cycles.

A GOTO command.

The GOTO command positions the read/write position pointer(s) on the given record position.

A MASK command.

The MASK command writes a new data string into the multiplexer, which selects the different events. Therefore, this command allows the events to which the controller responds to be changed.

An LLBACK command.

The LLBACK command generates a feedback to the PLU (as described in German Patent Application No. DE 44 16 881 A1). The switching table can cause greater regions of the unit to be reloaded, in particular it can cause the switching table itself to be reloaded.

A command triggering a read/modify/write cycle. The command triggers the reading of commands or data in another record, for example, by the controller, the PLU or an element located outside the switching table. This data is then processed in any desired fashion and written into the same or another position of the switching table ring memory. This can take place during one processing cycle of the switching table. The sequence is then terminated before a position pointer is repositioned.

The ring memory record architecture has the following format:

| Data/Command | Run/Stop | Data |
|---|---|---|

The first bit identifies a record as a command or a data string. The controller of the switching table thus decides whether the bit string in the data portion of the record should be treated as a command or as configuration data.

The second bit identifies whether the controller should proceed immediately even without the occurrence of another event, should proceed with the next record, or wait for the next event. If an oversampling process is used and the RUN bit is set, the subsequent records will be processed with the help of this oversampling cycle. This continues until a record without a RUN bit set has been reached or the number or records that can be processed at the oversampling cycle rate within one system cycle has been reached.

If an oversampling process is used, the normal system cycle and the RUN bit set cause commutation to take place.

Events occurring during the execution of a command sequence marked with the RUN bit are analyzed and the trigger signal is stored in a flip-flop. The controller then analyzes this flip-flop again when a record without a RUN bit set is reached.

The rest of a record contains, depending on the type (data or command), all the necessary information, so that the controller can fully perform its function.

The size of the ring memory can be implemented according to the application; this is true in particular for programmable units, where the ring memory is obtained by configuring one or more configurable cells.

A ring memory is connected to an element to be configured (or a group of elements to be configured), so that a selected configuration string (in the ring memory) is entered in the configuration register of the element to be configured or group of elements to be configured.

Thus a valid and operational configuration of the element or group to be configured is obtained.

Each ring memory has one controller or a plurality of controllers, which control the positioning of the read position pointer and/or the write position pointer.

Using the feedback channels described in German Patent Application No. DE 44 16 881 A1, the controller can respond to events of other elements of the unit or to external events that are transmitted into the unit (e.g., interrupt, IO protocols, etc.) and, in response to these internal or external events, moves the read position pointer and/or the write position pointer to another record.

The following events are conceivable, for example:

clock signal of a CPU, internal or external interrupt signal, trigger signal of other elements within the unit, comparison of a data stream and/or a command stream with a value, input/output events, counter run, overrun, reset, evaluation of a comparison.

If a unit has several ring memories, the controller of each ring memory can respond to different events.

After each time the pointer is moved to a new record, the configuration string in this record is transferred to the configurable element(s) connected to the ring memory.

This transfer takes place so that the operation of the unit parts that are not affected by the reconfiguration remains unchanged.

The ring memory(ies) may be located either in a unit or connected to the unit from the outside via an external interface.

Each unit may have a plurality of independent ring memories, which can be concentrated in a region of the unit, but can also be distributed in a reasonable manner on the surface of the unit.

The configuration data is loaded by a PLU, such as described in German Patent Application No. DE 44 16 881 A1, or by other internal cells of the unit into the memory of the switching table. The configuration data can also be simultaneously transferred by the PLU or other internal cells of the unit to several different switching tables in order to allow the switching tables to load simultaneously.

The configuration data can also be in the main memory of a data processing system and be transferred by known methods, such as DMA or other processor-controlled data transfer, instead of the PLU.

After the PLU has loaded the ring memory of the switching table, the controller of the switching table is set to a start status, which establishes a valid configuration of the complete unit or parts of the unit. The control of the switching table starts now with repositioning of the read position pointer and/or the write position pointer as a response to events taking place.

In order to cause new data to be loaded into the switching table or a number of switching tables, the controller can return a signal to the PLU, as described in German Patent Application No. DE 44 16 881 A1, or other parts of the unit that are responsible for loading new data into the ring memory of the switching table. Such a feedback can be triggered by the analysis of a special command, a counter status, or from the outside (the State-Back UNIT described in Patent Application PACT02).

The PLU or other internal cells of the unit analyze this signal, respond to the signal by executing a program possibly in a modified form, and transfer new or different configuration data to the ring memory(ies). Only the data of each ring memory that is involved in a data transfer as determined by the signal analysis, rather than the configuration data of a complete unit, must be transferred.

Buffer

A memory can be connected to individual configurable elements or groups thereof (hereinafter referred to as functional elements). Several known procedures can be used to configure this memory; FIFOs are well-known, in particular. The data generated by the functional elements are stored in the memory until a data packet with the same operation to be performed is processed or until the memory is full. Thereafter the configuration elements are reconfigured through switching tables, i.e., the functions of the elements are changed. FullFlag showing that the memory is full can be used as a trigger signal for the switching tables. In order to freely determine the amount of data, the position of the FullFlag is configurable, i.e., the memory can also be configured through the switching table. The data in the memory is sent to the input of the configuration elements, and a new operation is performed on the data; the data is the operand for the new computation. The data can be processed from the memory only, or additional data can be requested from the outside (outside the unit or other functional elements) for this purpose. As the data is processed, it (the result of the operation) can be forwarded to the next configuration elements or written into the memory again. In order to provide both read and write access to the memory, the memory can have two memory arrays, which are processed alternately, or separate read and write position pointers can exist in the same memory.

One particular configuration option is the connection of a plurality of memories as described above, which allows several results to be stored in separate memories; then, at a given time, several memory regions are sent to the input of a functional element and processed in order to execute a given function.

Architecture of a Ring Memory Record

One possible structure of the records in a switching table ring memory, used in a data processing system as described in German Patent Application No. DE 44 16 881 A1 is described below. The following tables show the command architecture using the individual bits of a command string.

| Bit Number | Name | Description |
| --- | --- | --- |
| 0 | Data/Command | Identifies a record as a data or command string |
| 1 | Run/Stop | Identifies Run or Stop mode |

Thus, if a record is a data record, bit number 0 has the value 0, so the bits from position two have the following meanings:

| Bit Number | Name | Description |
| --- | --- | --- |
| 2–6 | Cell number | Provides the cell numbers within a group using the same switching table |
| 7–11 | Configuration data | Provides the function that the cell (e.g., an EALU) should execute |

If the record is a command, bit number 0 has the value 1, and the bits from position two have the following meanings:

| Bit Number | Name | Description |
| --- | --- | --- |
| 2–6 | Command number | Provides the number of the command that is executed by the switching table controller |
| 7 | Read/Write position pointer | Shows whether the command is to be applied to the read position pointer or the write position pointer. If the command does not change either position pointer, the bit status is undefined. |
| 8–n | Data | Depending on the command, the data needed for the command are stored starting with bit 8. |

In the following table, bits 2–6 and 8–n are shown for each of the commands listed. The overall bit length of a data string depends on the unit where the switching table is used. The bit length must be chosen so as to code all data needed for the commands in the bits starting from position 8.

| Command | Bit 2–6 | Description of bit 8–n |
| --- | --- | --- |
| WAIT | 00 00 0 | Number indicating how often an event is to be waited for |
| SKIP1 | 00 00 1 | Number with plus or minus sign showing how many records are to be skipped forward (backward if negative) |
| SKIP2 | 00 01 0 | See SKIP1 |
| SWAP | 00 01 1 | 1st record position, 2nd record position |
| RESET | 00 10 0 | Number of the record on which the position pointer is to be set |
| WAIT-GOTO | 00 10 1 | Number indicating how often an event is to be waited for, followed by the number of the record on which the position pointer is to be positioned |

-continued

| Command | Bit 2–6 | Description of bit 8–n |
|---|---|---|
| NOP | 00 11 0 | No function! |
| GOTO | 00 11 1 | Number of the record on which the position pointer is to be positioned |
| MASK | 01 00 0 | Bit pattern entered into the multiplexer to select the events |
| LLBACK | 01 00 1 | A trigger signal is generated for the PLU (feedback) |

Reconfiguring ALUs

One or more switching tables can be used for controlling an ALU. The present invention can be used, for example, to improve on Patent PACT02, where the switching table is connected to the M/F PLUREG registers or the M/F PLUREG registers are fully replaced by a switching table.

FIG. 1 shows the schematic architecture of a ring memory. It comprises a write position pointer 0101 and a read position pointer 0102, which access a memory 0103. This memory can be configured as a RAM or as a register. Using the read/write position pointer, an address of RAM 0104 is selected, where input data is written or data is read, depending on the type of access.

FIG. 2 shows the internal architecture of a simple ring memory. Read position pointer 0204 has a counter 0201 and write position pointer 0205 has a counter 0206. Each counter 0201, 0206 has a global reset input and an up/down input, through which the counting direction is defined. A multiplexer 0202, whose inputs are connected to the outputs of the counters, is used to switch between write 0205 and read 0204 position pointers, which point to an address of memory 0203. Read and write access is performed through signal 0207. The respective counter is incremented by one position for each read or write access. When the read 0204 or write 0205 position pointer points at the last position of the memory (last address for an upward counting counter or first address for a downward counting counter), the read or write position pointer 0204, 0205 is set to the first position of memory 0203 in the next access (first address for an upward counting counter or the last address for a downward counting counter). This provides the ring memory function.

Figure 3A:
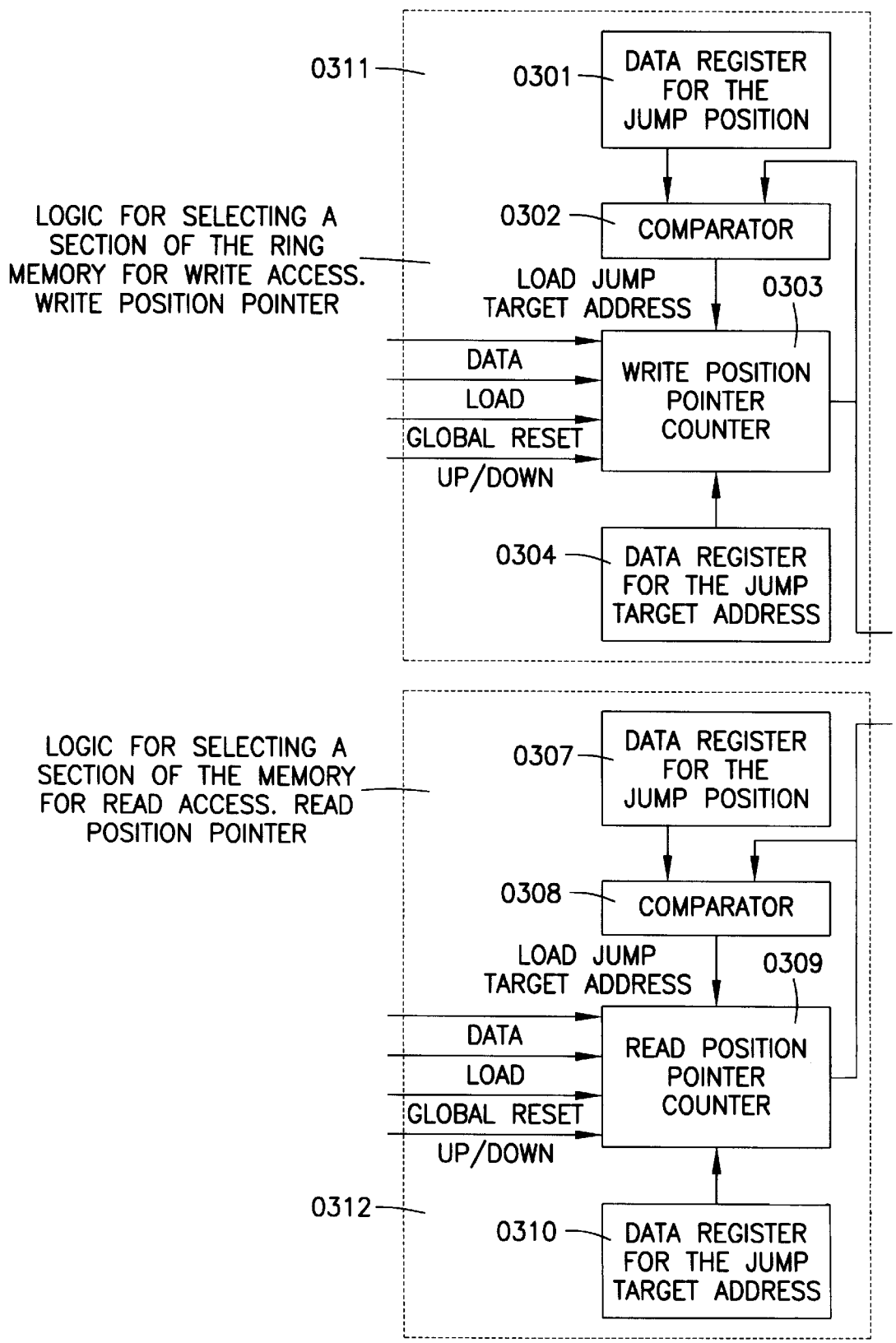
FIG. 3 illustrates a ring memory with a selectable work area.
Figure 3B:
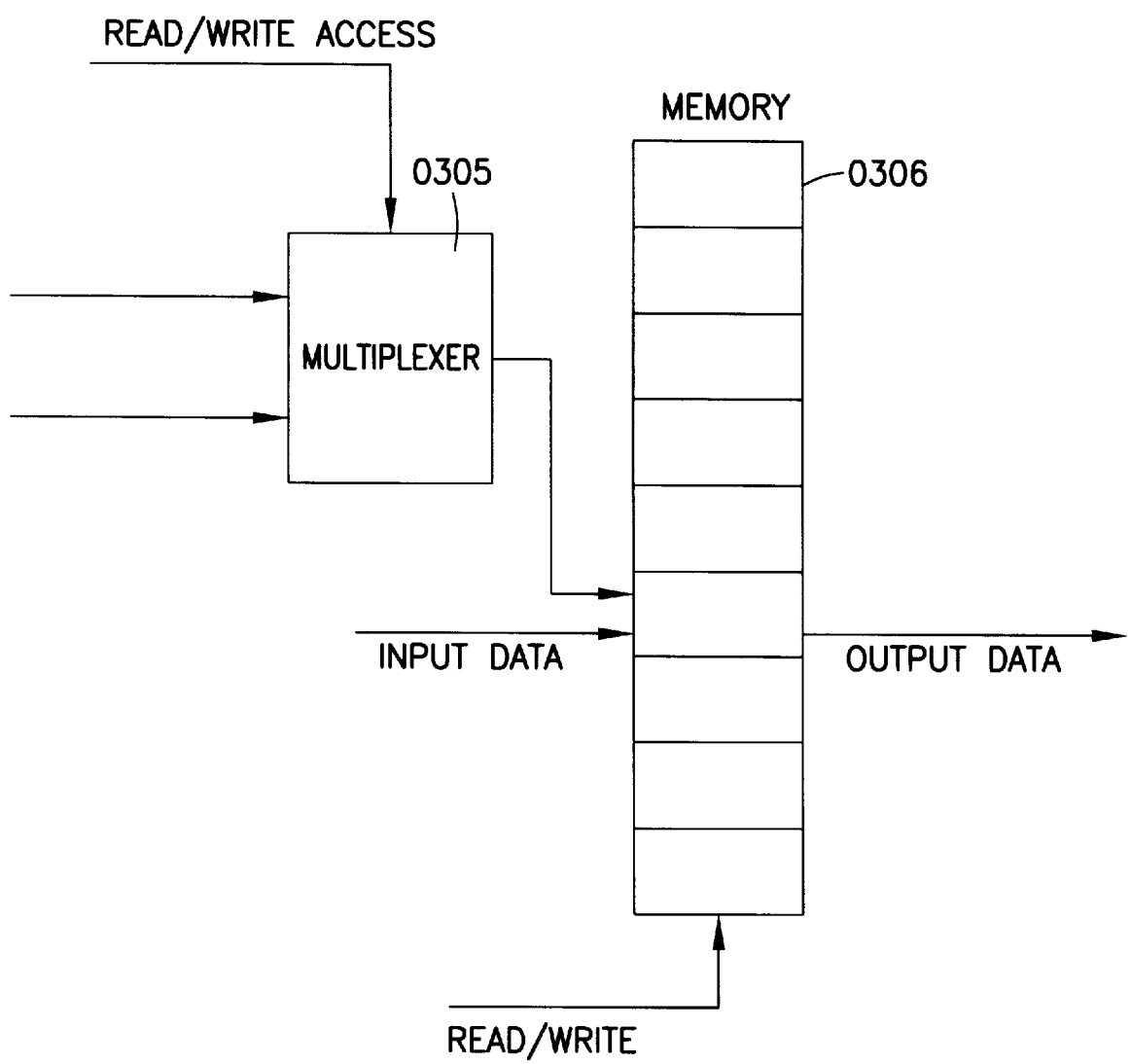

FIG. 3 shows an extension of the normal ring memory. In this extension, counter 0303 of the write position pointer 0311 and counter 0309 of the read position pointer 0312 can be loaded with a value, so that each address of the memory can be set directly. This loading sequence takes place, as usual, through the data and load inputs of the counters. In addition, the work area of the ring memory can be limited to a certain section of internal memory 0306. This is accomplished using an internal logic controlled by counters 0303, 0309 of the write/read position pointers 0311, 0312. This logic is designed as follows: The output of one counter 0303, 0309 is connected to the input of the respective comparator 0302, 0308, where the value of the counter is compared with the value of the respective data register (0301, 0307) where the jump position, i.e., the end of the ring memory section, is stored. If the two values are the same, the comparator (0302, 0308) sends a signal to the counter (0303, 0309), which then loads the value from the data register for the target address of the jump (0304, 0310), i.e., the beginning of the ring memory section. The data register for the jump position (0301, 0307) and the data register for the target address (0304, 0310) are loaded by the PLU (see PACT01). With this extension, it is possible that the ring memory does not use the entire region of the internal memory, but only a selected portion. In addition, the memory can be subdivided into different sections when several such read/write position pointers (0312, 0311) are used.

Figure 4A:
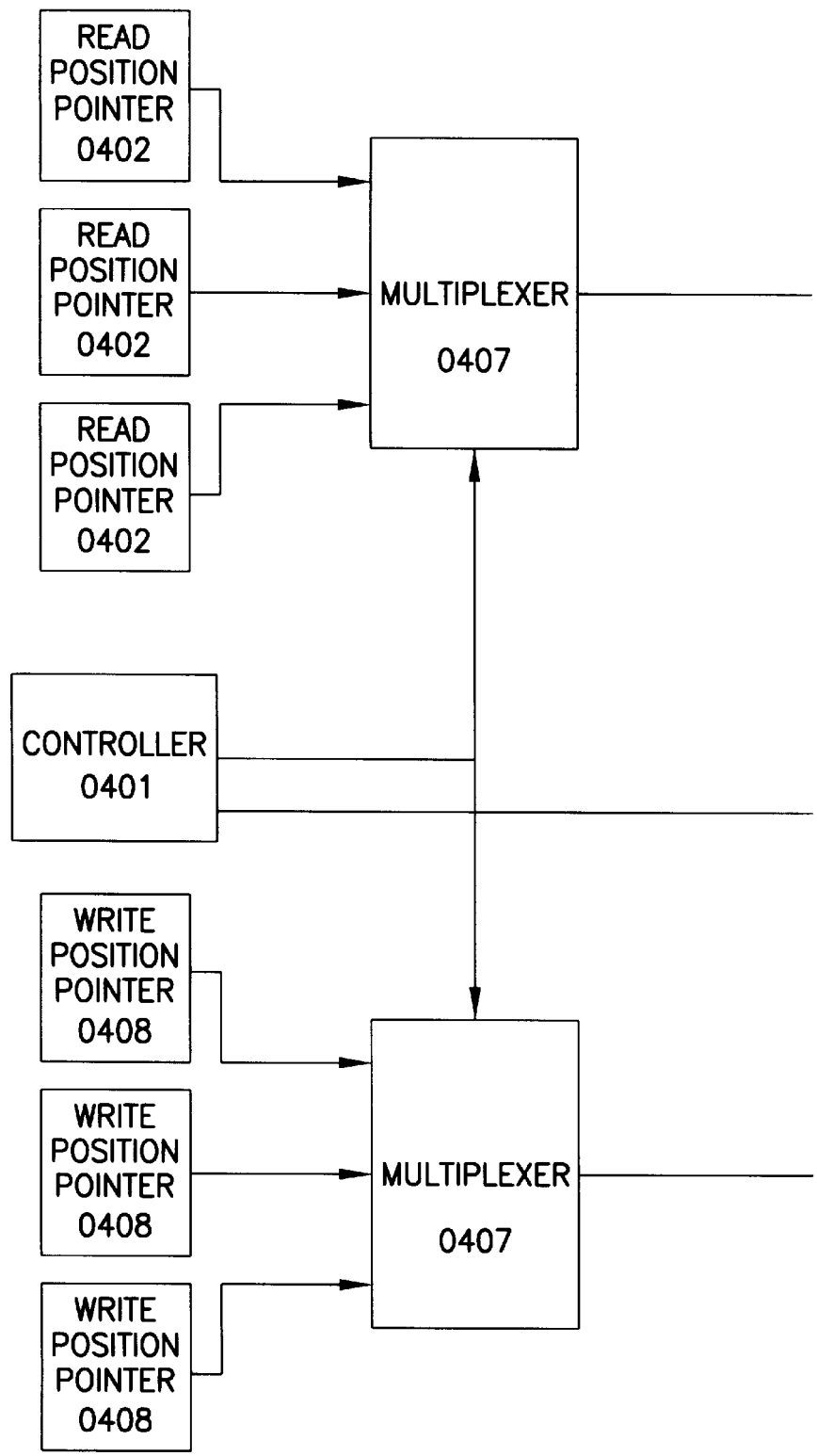
FIG. 4 illustrates a ring memory and a controller capable of working on different ring memory sections using several read and write position pointers.
Figure 4B:
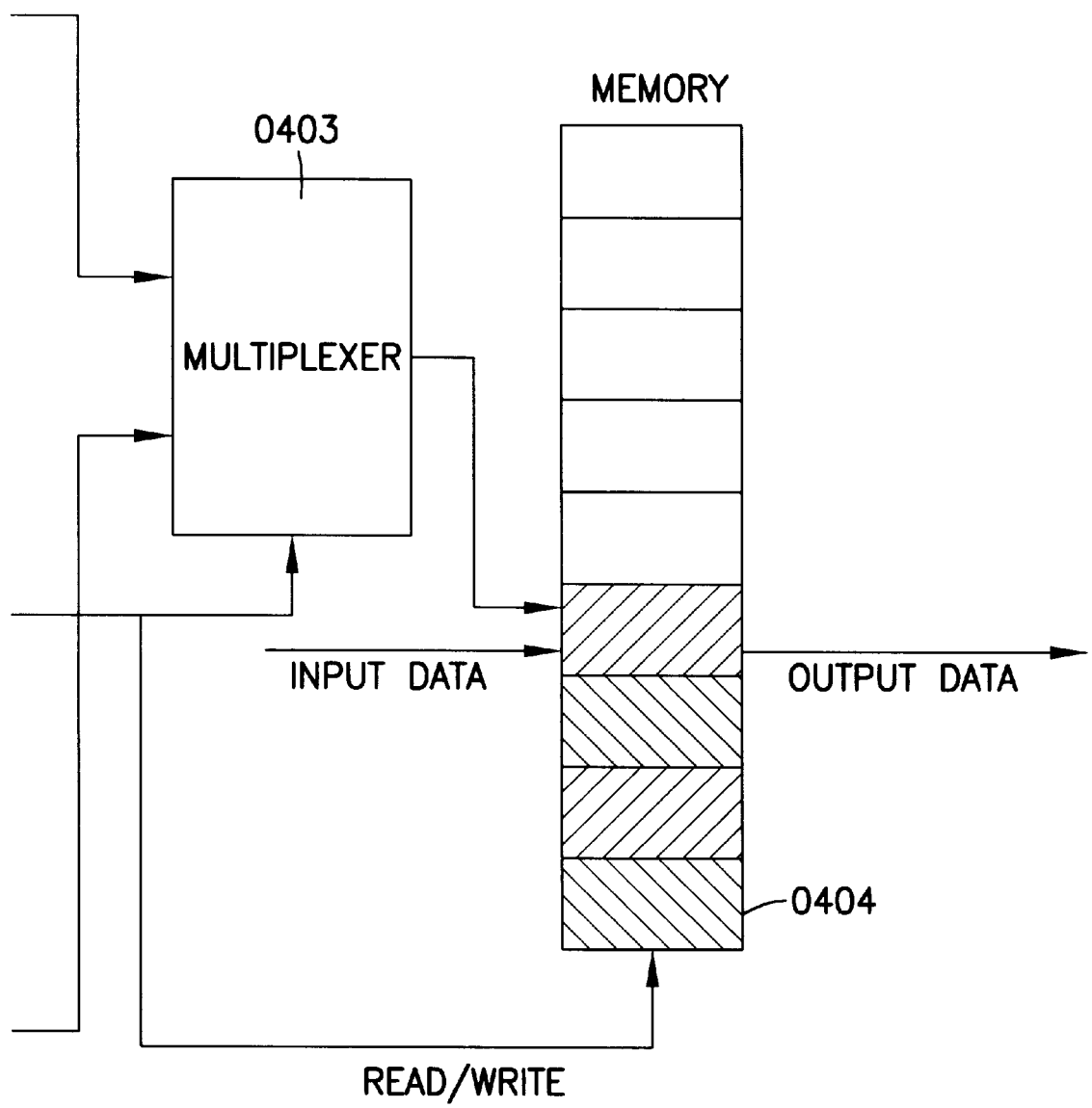

FIG. 4 shows the architecture of a ring memory divided into several sections with controller 0401 working on one of said sections. The controller is described in more detail in FIG. 7. In order to allow the ring memory to be divided into several sections, several read/write position pointers (0408, 0402), whose architecture was shown in FIG. 3, are used. The controller selects the region where it operates through multiplexer 0407. Read or write access is selected via multiplexer 0403. Thus the selected read/write position pointer addresses an address of memory 0404.

Figure 5A:
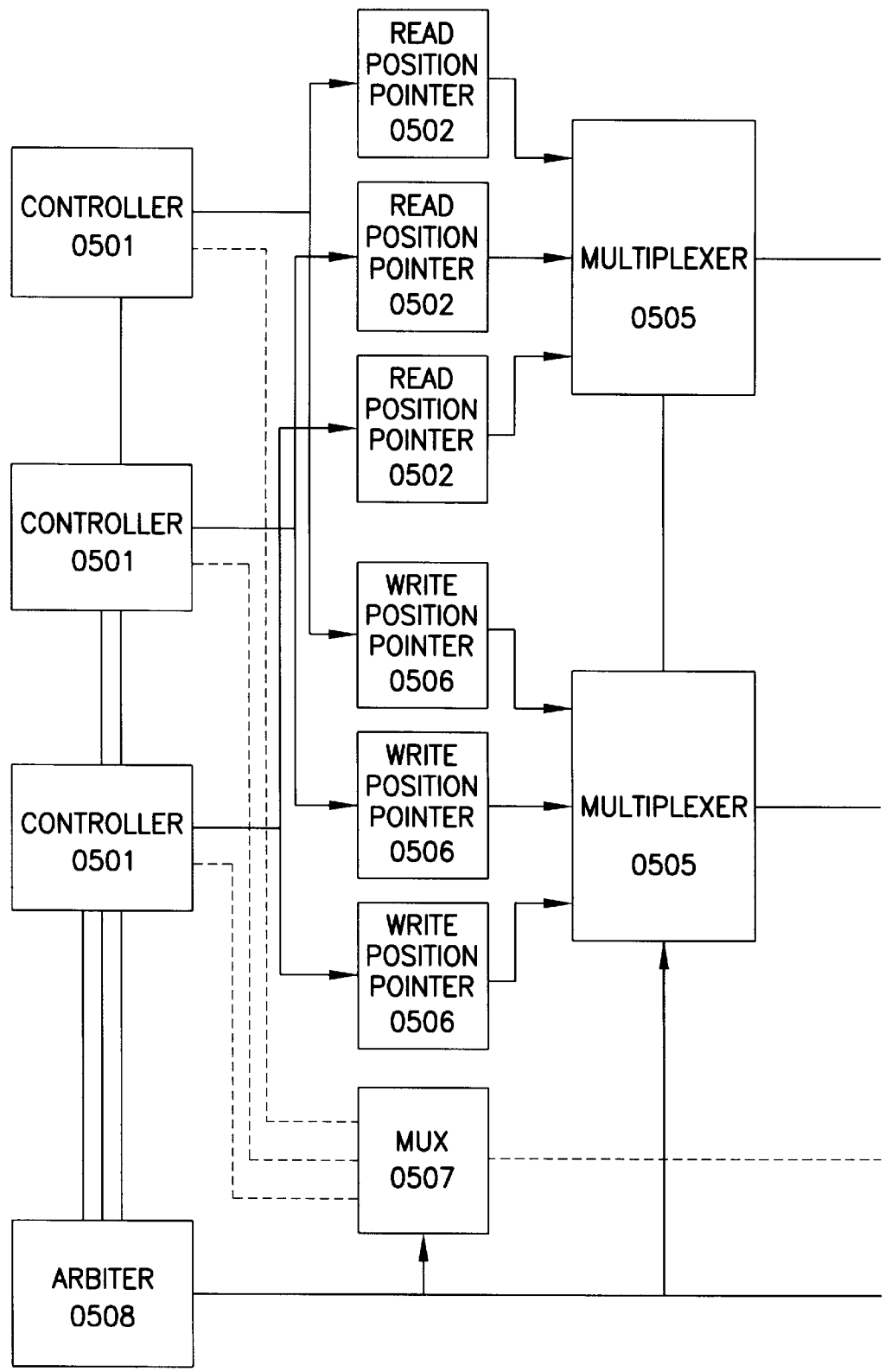
FIG. 5 illustrates a ring memory where different controllers access different sections.
Figure 5B:
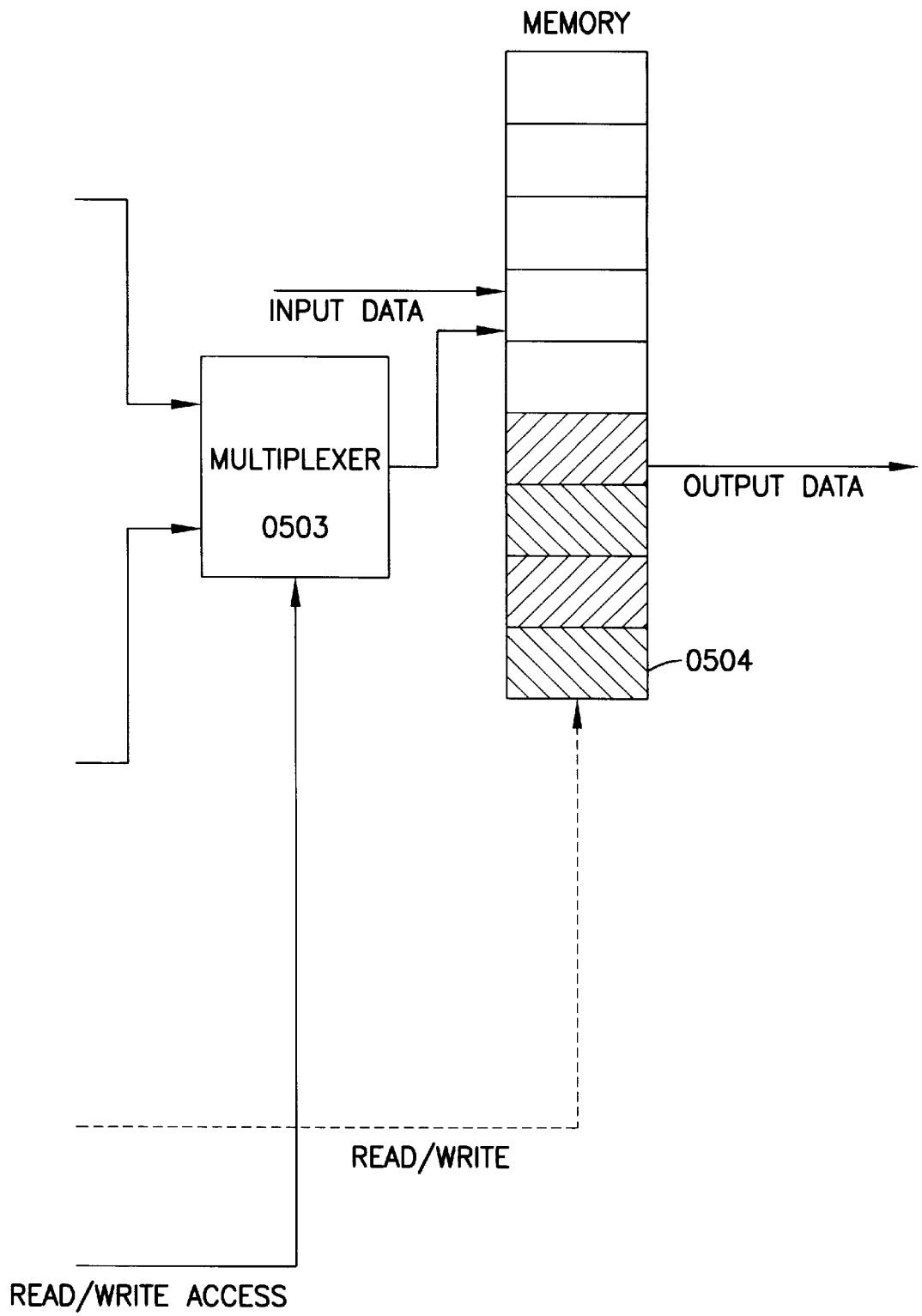

FIG. 5 shows the case where each of a plurality of controllers 0501 operates in its own region of the ring memory via one read- and write-position pointer 0502, 0506 per controller. Each controller 0501 has a write position pointer 0506 and a read position pointer 0502. Using multiplexer 0503, which of the read and write position pointers 0502, 0506 accesses memory 0504 is selected. Either a read access or a write access is selected via multiplexer 0503. The read/write signal of controllers 0501 is sent to memory 0504 via multiplexer 0507. The control signal of multiplexers 0507, 0505, 0503 goes from controllers 0501 via an arbiter 0508 to the multiplexers. Arbiter 0508 prevents several controllers from accessing multiplexers 0507, 0505, 0503 simultaneously.

Figure 6:
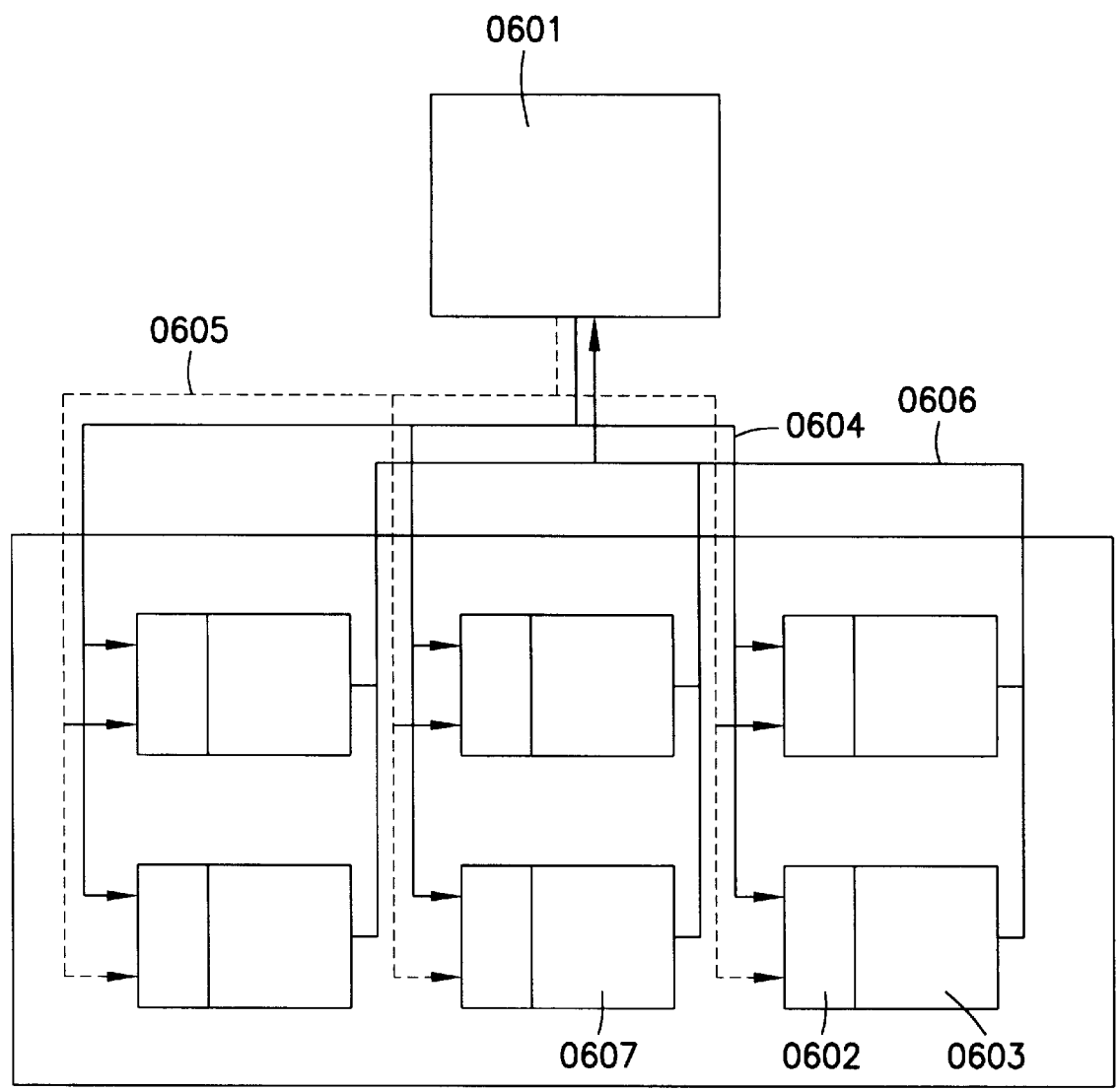
FIG. 6 illustrates a ring memory and its connection to the configurable elements.

FIG. 6 shows a ring memory 0601 and its connection with configuration elements 0602. Ring memory 0601 is connected via lines 0604, 0605, 0606. The addresses of the addressed cells 0607 are transmitted via 0604. Line 0605 transmits the configuration data from the ring memory. Via line 0606, cells 0607 transmit the feedback whether reconfiguration is possible. The data stored in the ring memory is entered in configuration element 0602. This configuration element 0602 determines the configuration of configurable elements 0603. Configurable elements 0603 may comprise logical units, ALUs, for example.

Figure 7:
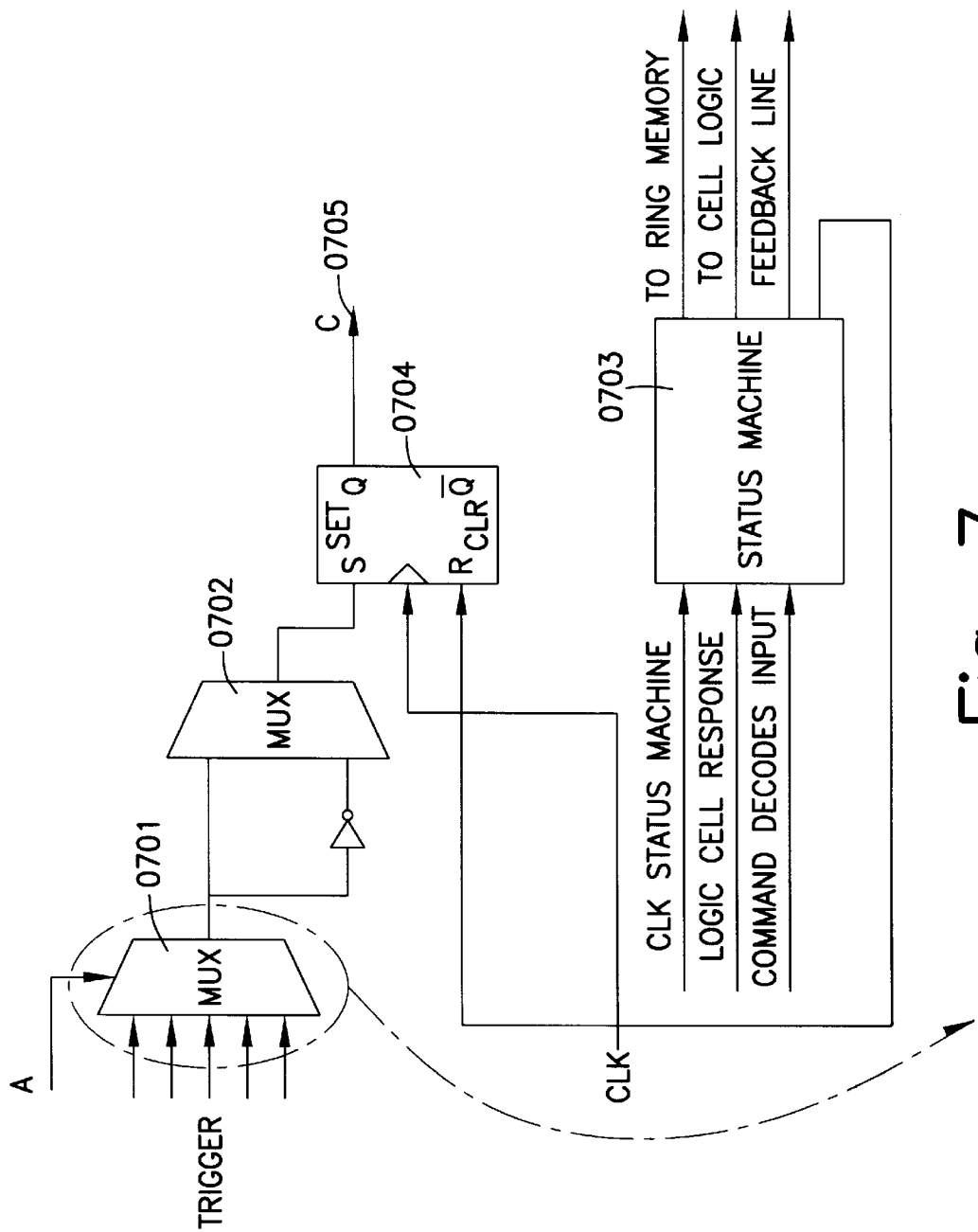
FIG. 7 illustrates the controller with a logic for responding to different trigger signals.

FIG. 7 shows a controller that may respond to different triggering events. The individual triggering events can be masked, so that only one triggering event is accepted at any time. This is achieved using multiplexer 0701. The trigger signal is stored with flip-flop 0704. Multiplexer 0702, which can be configured as a mask via AND gates (see FIG. 7a), is used to process low active and high active triggering signals. The triggering signal stored in the flip-flop is relayed via line 0705 to obtain a clock signal, which is described in FIG. 8. The state machine 0703 receives its clock signal from the logic that generates the clock signal and, depending on its input signals, delivers an output signal and a reset signal to reset flip-flop 0704 and stop processing until the next trigger signal. The advantage of this implementation is the power savings when the clock is turned off, since state machine 0703 is then idle. An implementation where the clock is permanently applied and the state machine is controlled by the status of the command decoder and the run bit is also conceivable.

Figure 7A:
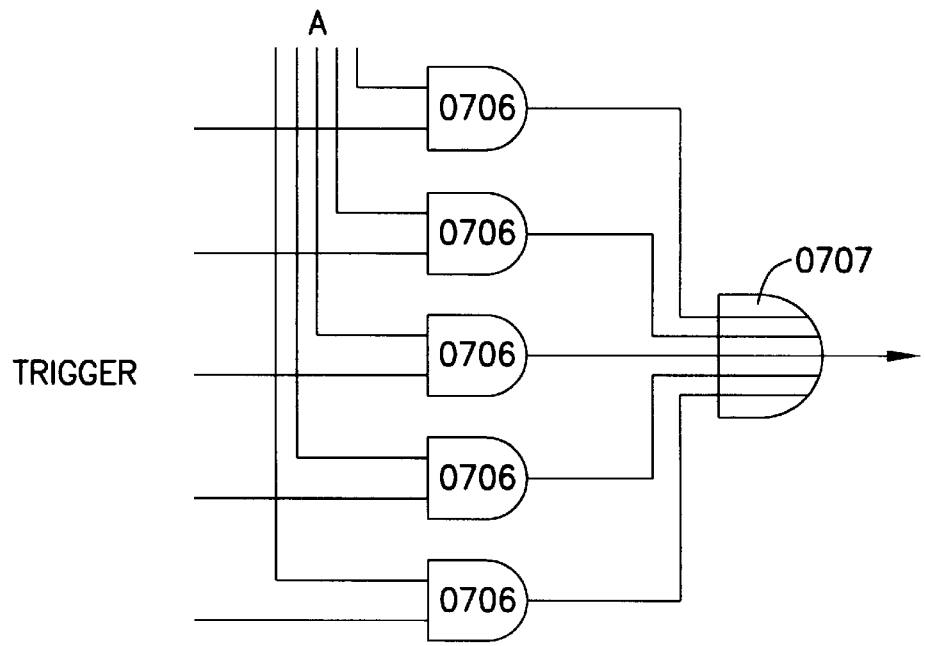
FIG. 7a shows an implementation of the trigger pulse mask.
Figure 8:
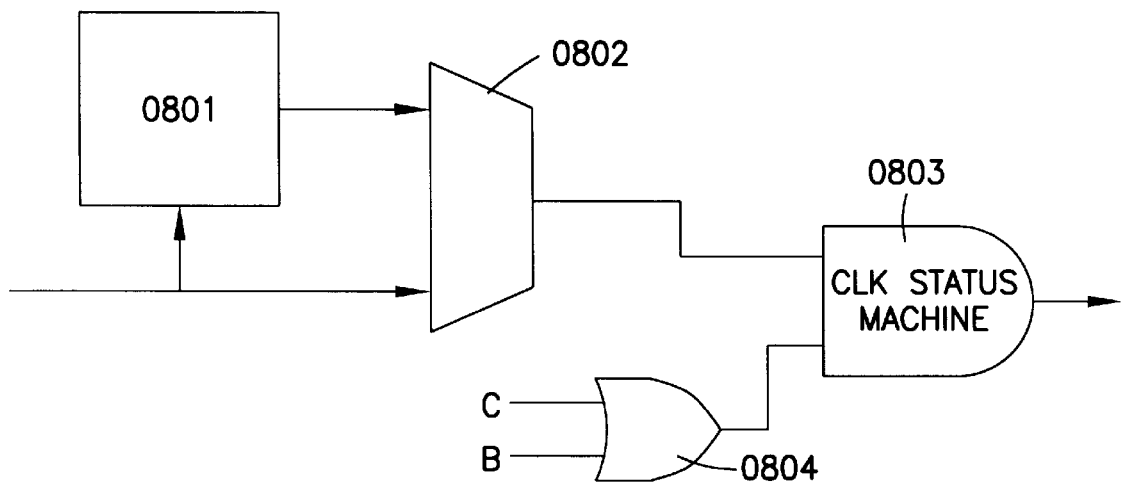
FIG. 8 illustrates the clock generator for the controller.

FIG. 7a shows the masking of the trigger signals. The trigger signals and lines from A are connected to the inputs of AND gate 0706. The outputs of AND gate 0706 are OR-linked with 0707 to generate the output signal. FIG. 8 shows the logic for generating the clock signal for the state machine. Another clock signal is generated in 0801 with the help of a PLL. Using multiplexer 0802, the normal chip clock or the clock of PLL 0801 can be selected. Signals C and B are sent to OR gate 0804. Signal C is generated as a result of a trigger event in the controller (see FIG. 7, 0705). Signal B originates from bit 1 of the command string (see FIG. 10, 1012). This bit has the function of a run flag, so that the controller continues to operate, independently of a trigger pulse, if the run flag is set. The output of OR gate 0804 is AND-linked with the output of multiplexer 0802 to generate the clock signal for the state machine.

Figure 9:
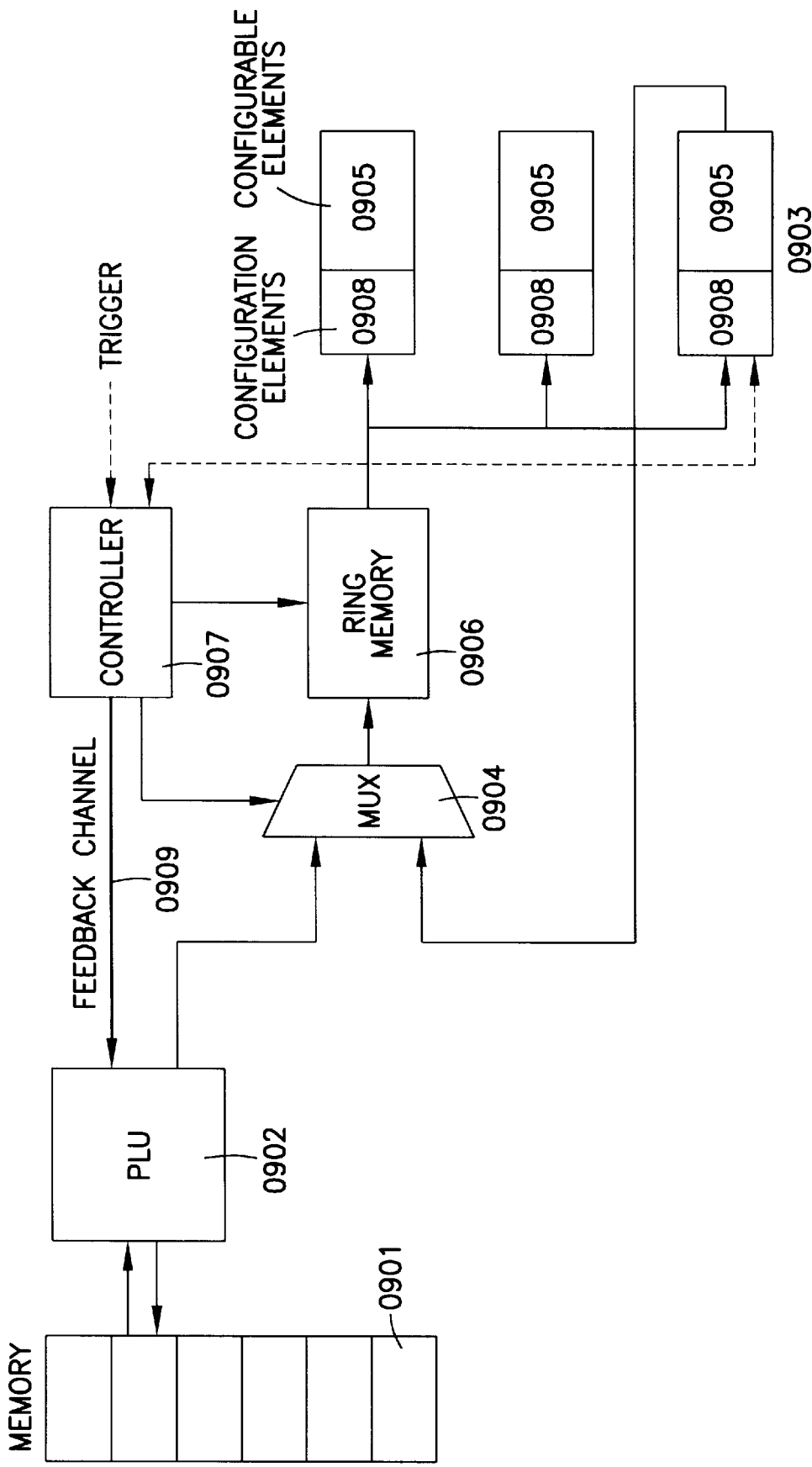
FIG. 9 illustrates the wiring of the controller and the internal cells allowing the configurable elements to be configured.

FIG. 9 shows the connection between controller 0907, PLU 0902 with memory 0901, ring memory 0906, configurable elements 0905, and configuration elements 0908, as well as the internal cells 0903 used for the configuration. The internal cell 0903 used for configuration is shown here as a normal cell with configurable elements 0905 and configuration elements 0908. Ring memory 0906 is connected to configuration elements 0908 and is in turn controlled by controller 0907. Controller 0907 responds to different trigger pulses, which may also originate from the internal cell 0903 used for configuration. Controller 0907 informs PLU 0902, via feedback channel 0909, if new data is to be loaded into ring memory 0906 due to a trigger event. In addition to sending this feedback, controller 0907 also sends a signal to multiplexer 0904 and selects whether data is sent from PLU 0902 or internal cell 0903 used for configuration to the ring memory.

In addition to the configuration of the ring memory by the PLU, the ring memory can also be set as follows: Configurable element 0903 is wired so that it generates, alone or as the last element of a group of elements, records for ring memory 0906. It generates a trigger pulse, which advances the write position pointer in the ring memory. In this mode, multiplexer 0904 switches the data from 0903 through to the ring memory, while with a configuration by the PLU the data are switched through by the PLU. It would, of course, be conceivable that additional permanently implemented functional units might serve as sources of the configuration signals.

Figure 10:
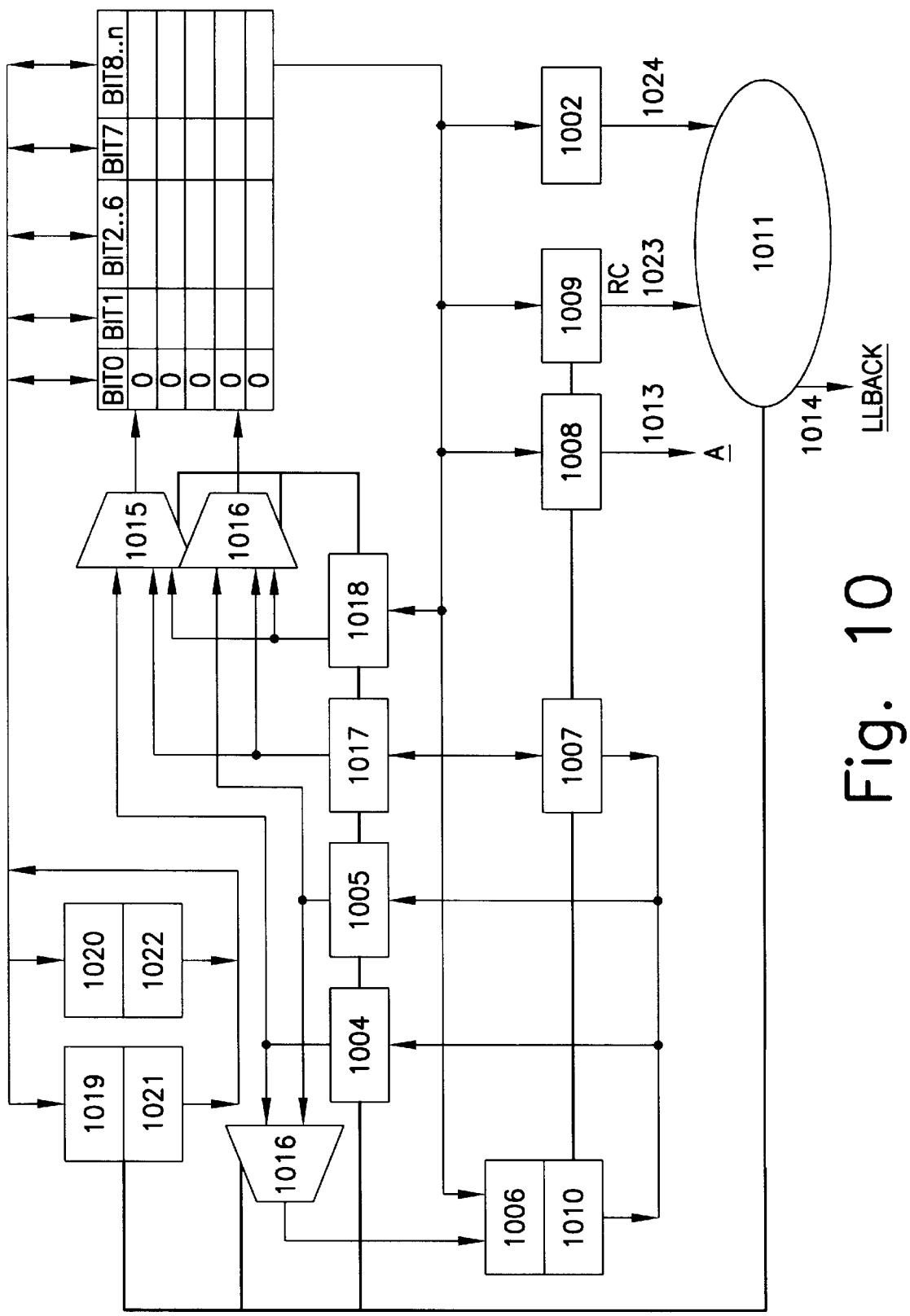
FIG. 10 illustrates the processing by the controller of the commands stored in the ring memory.

FIG. 10 shows the processing by the controller of the commands stored in the ring memories. 1001 represents the memory of the ring memory with the following bit assignment. Bit 0 identifies the record as a data or command string. Bit 1 identifies the run and stop modes. Bits 2–6 identify the command number coding the commands. Bit 7 tells whether the command is to be applied to the read or write position pointer. If the command affects no position pointer, bit 7 is undefined. The data needed for a command is stored in bits 8–n. Counters 1004, 1005 form the write and read position pointers of the ring memory. If the controller receives a trigger pulse, the state machine sends a pulse to the read position pointer. The write position pointer is not needed to read a command, but is only used for entering data in the ring memory. The selected read position pointer moves forward one position, and a new command is selected (bit 0=0). Now bits 2–6 and bit 7 are sent to command decoder 1002, are decoded, and the result is relayed to the state machine (1024), which recognizes the type of command and switches accordingly.

If it is a SKIP command, state machine 1011 sends a pulse to adder/subtractor 1006 so it can add/subtract the bit 8–n command string data to/from the data sent by counters 1004, 1005 via multiplexer 1003. Depending on bit 7, multiplexer 1003 selects the counter of write position pointer 1004 or the counter of read position pointer 1005. After the data has been added/subtracted, state machine 1011 activates gate 1010 and sends a receive signal to counter 1004, 1005. Thus the selected position pointer points as many positions forward or backward as set forth in the data of the SKIP command.

Upon a GOTO command, gate 1007 is activated by state machine 1011 so that the data goes to read position pointer 1005 or write position pointer 1004 and is received there.

Upon a MASK command, the data is received in a latch 1008 and stored there. This data is then available to the controller described in FIGS. 7/7a via line A (1013) where it masks all the trigger inputs which should receive no trigger pulse.

Upon a WAIT command, an event is waited for as often as set forth in the data bits. If this command is registered by state machine 1011, it sends a pulse to wait cycle counter 1009 which receives the data. The wait cycle counter then counts one position downward for each event relayed by state machine 1011. As soon as it has counted to zero, the carry flag is set and sent to state machine 1011 (1023). The state machine then continues to operate due to the carry flag.

Upon a WAIT-GOTO command, the data providing the number of wait events is received in the wait cycle counters. After receipt of the number of events given in the data, the state machine activates gate 1007 and relays the jump position data to the selected counter.

The SWAP command is used for swapping two records between two positions of the ring memory. The address of the first record to be swapped is stored in latch 1017; the address of the second record is stored in latch 1018. The addresses are sent to multiplexers 1015 and 1016 of the read/write pointer. Initially, record 1 is selected via 1016 and stored in latch 1019; then record 2 is selected via 1016 and stored in 1020. The write pointer is first positioned on the first record via 1015, and the data formerly of the second record is stored via gate 1022. Then the write pointer is positioned on the second record via 1015 and the data formerly of the first record is stored via gate 1021.

State machine 1011 sends feedback to the PLU via 1014 (e.g., via a State-Back UNIT, see PACT02). The state machine sends a signal via this connection as soon as an LLBack command is registered.

Bit 1, used as a run flag, is sent to the controller for generating a clock signal, which is described in FIG. 8.

The NOP command is registered in the state machine, but no operation is performed.

Figure 11:
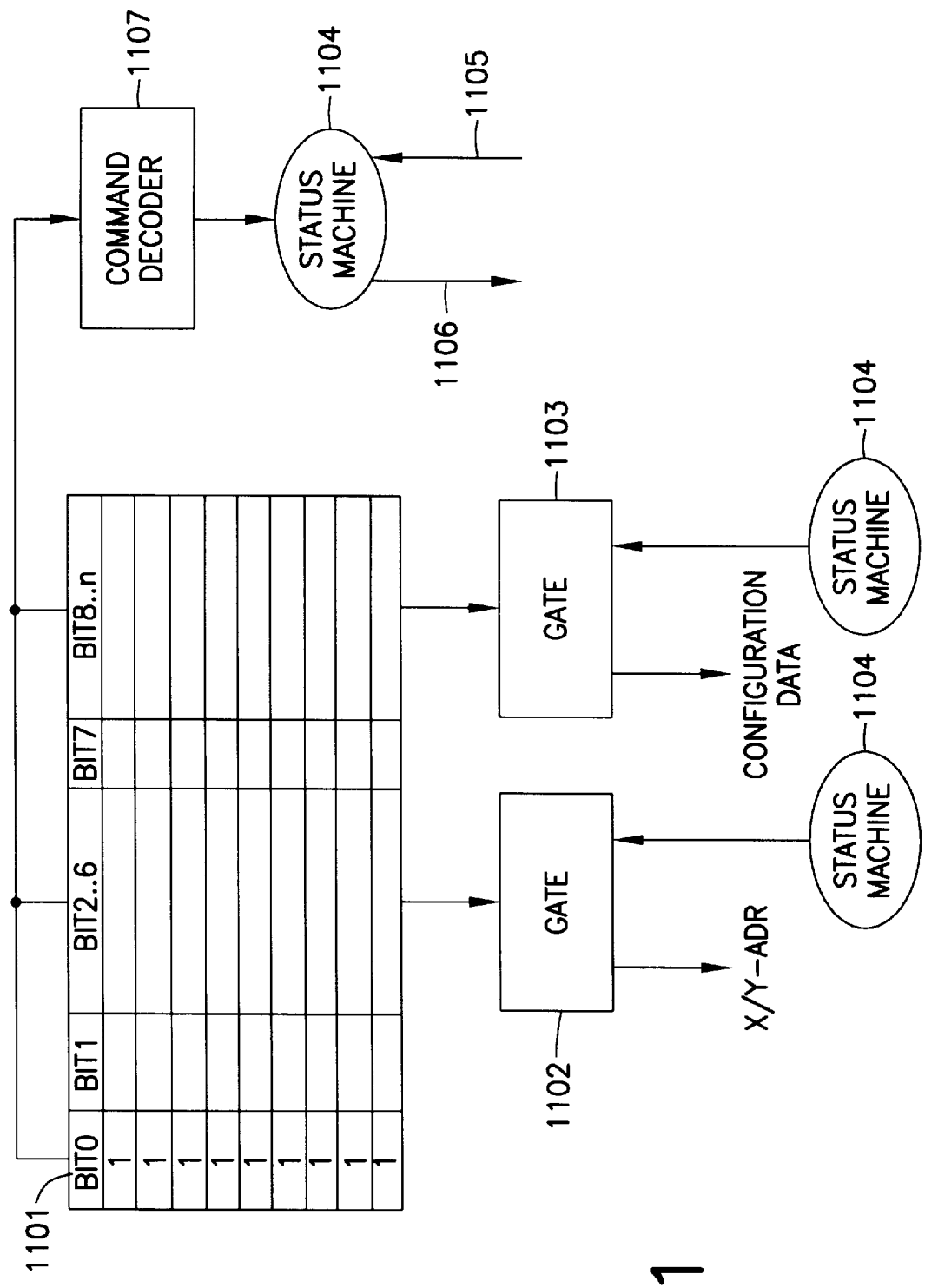
FIG. 11 illustrates the processing of the data stored in the ring memory.

FIG. 11 shows the processing of a data string stored in the ring memory. 1101 corresponds to 1001 in FIG. 10. Since this is a data string, bit 0 is set to one. Command decoder 1107 recognizes the data string as such and sends a query 1106 to the cell addressed in bits 2–6 to verify if reconfiguration is possible. The query is sent at the same time gate 1102 is activated, which causes the address of the cell to be transmitted. The cell shows via 1105 whether reconfiguration is possible. If so, the configuration data is transmitted to the cell via gate 1103. If no reconfiguration is possible, processing continues, and reconfiguration is attempted again in the next cycle in the ring memory. Another possible sequence would be the following: The state machine activates gates 1102 and 1103 and transmits the data to the cell addressed. If the cell can be reconfigured, the cell acknowledges receipt of the data via 1105. If no configuration is possible, the cell does not send a receive signal, and reconfiguration is attempted again in the next cycle of the ring memory.

Figure 12:
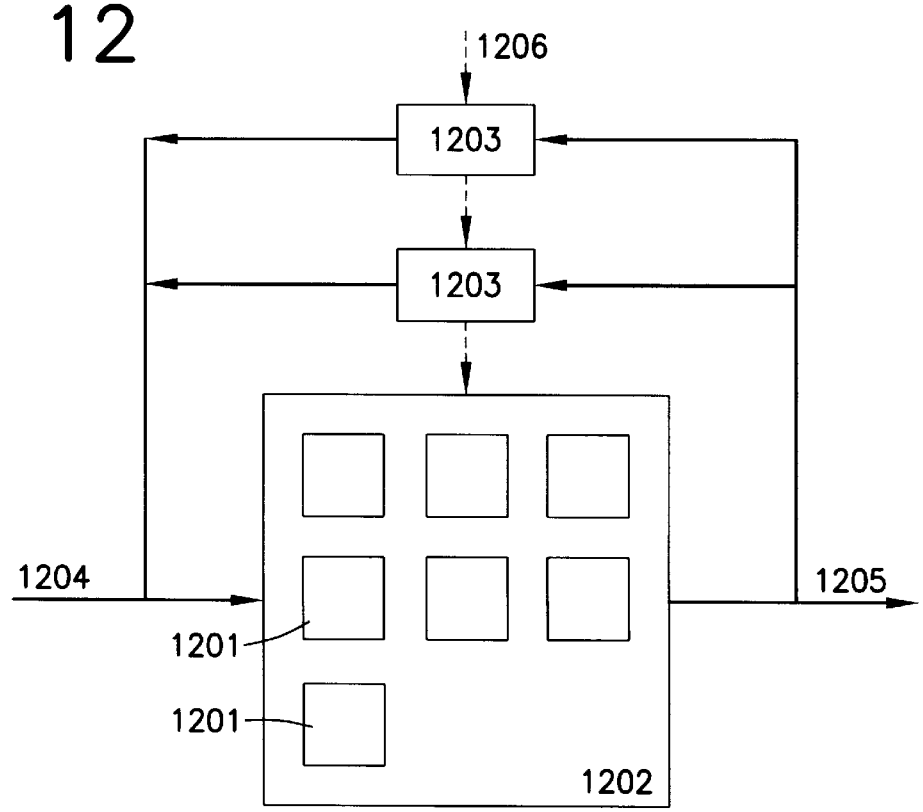
FIG. 12 illustrates the connection of a buffer comprising two memory arrays to a set of configurable elements.

FIG. 12 shows a group (functional element) 1202 of configurable elements 1201. The data is sent to the functional element via input bus 1204, and the results are sent forth via output bus 1205. Output bus 1205 is also connected to two memory arrays 1203, which operate alternately as a read or write memory. Their outputs are connected to input bus 1204. The entire circuit can be configured via a bus leading to switching tables 1206; the trigger signals are transmitted to the switching table and the configuration data is transmitted from the switching table via this bus. In addition to the function of the functional element, the write/read memory active at that time and the depth of the respective memory are set.

Figure 12A:
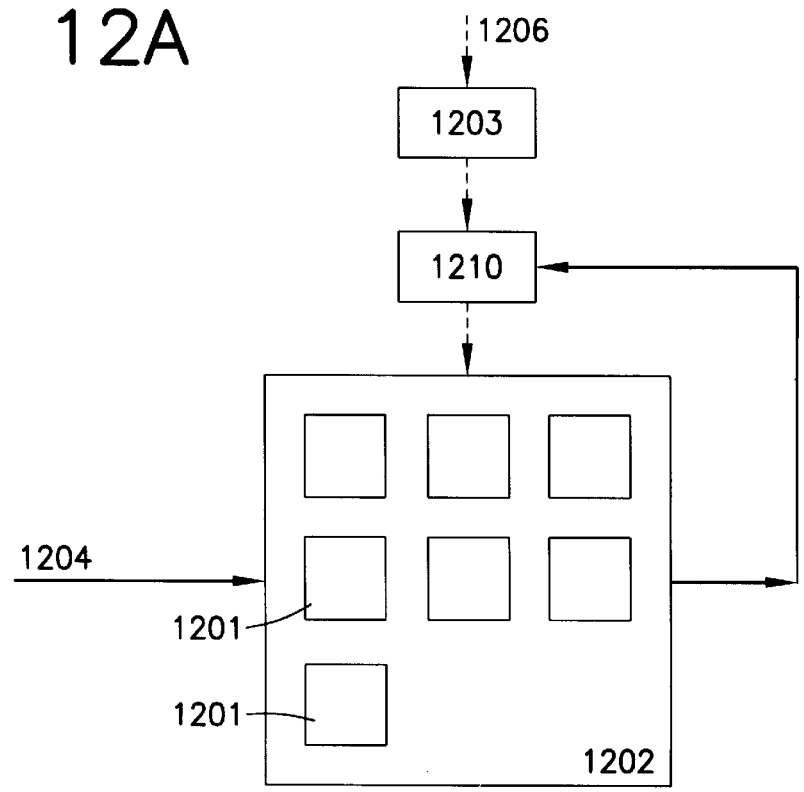
FIG. 12a shows a step in the data processing sequence.

FIG. 12*a* shows how external data 1204, i.e., data of another functional unit or from outside the unit, is computed in the functional element 1202 and then written into write memory 1210.

Figure 12B:
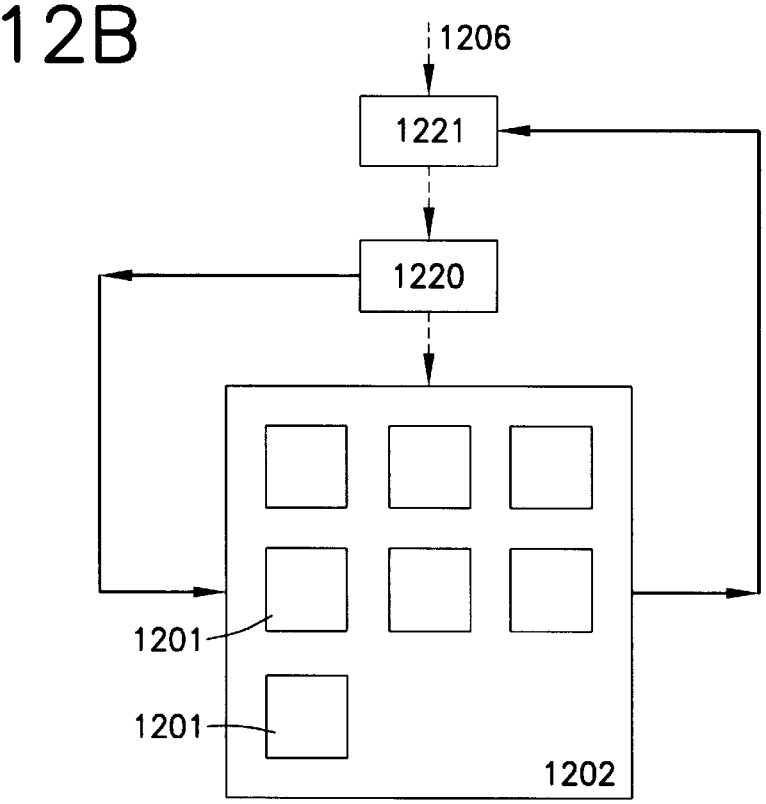
FIG. 12b shows another step in the data processing sequence.

FIG. 12*b* shows the next step after FIG. 12*a*.

Functional element 1202 and memories 1220, 1221 are reconfigured upon a trigger generated by the functional element or the memories or another unit and transmitted over 1206. Write memory 1210 is now configured as a read memory 1220 and delivers the data for the functional element. The results are stored in write memory 1221.

Figure 12C:
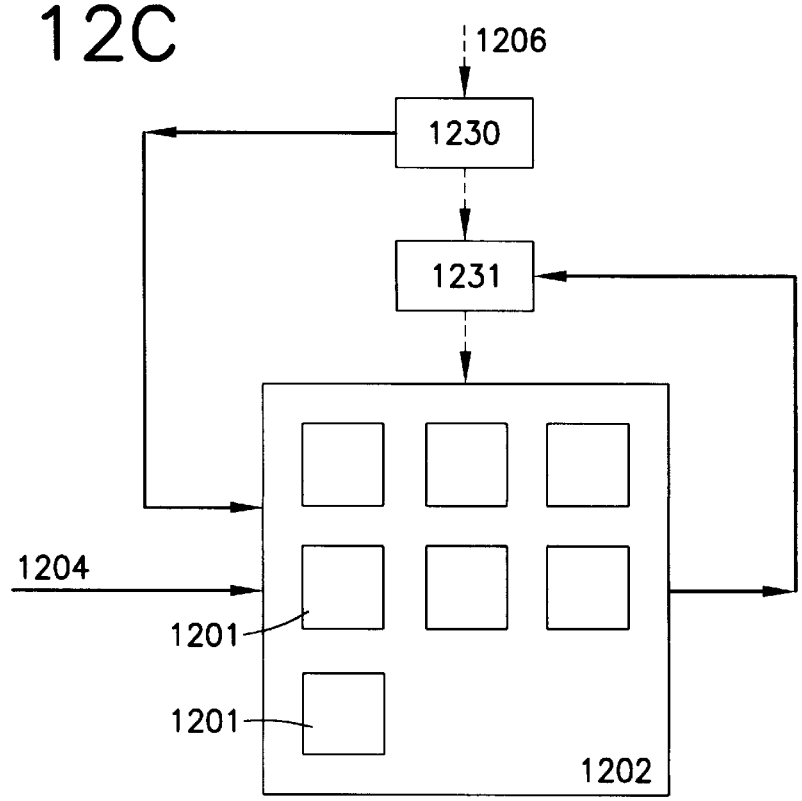
FIG. 12c shows another step in the data processing sequence.

FIG. 12*c* shows the step following FIG. 12*b*.

Functional element 1202 and memories 1230, 1231 were reconfigured upon a trigger generated by the functional element or the memories or another unit and transmitted over 1206. Write memory 1221 is now configured as a read memory 1230 and delivers the data to the functional element. The results are stored in write memory 1231. In this example, additional external operands 1204, i.e., from another functional unit or from outside the unit, are also processed.

Figure 12D:
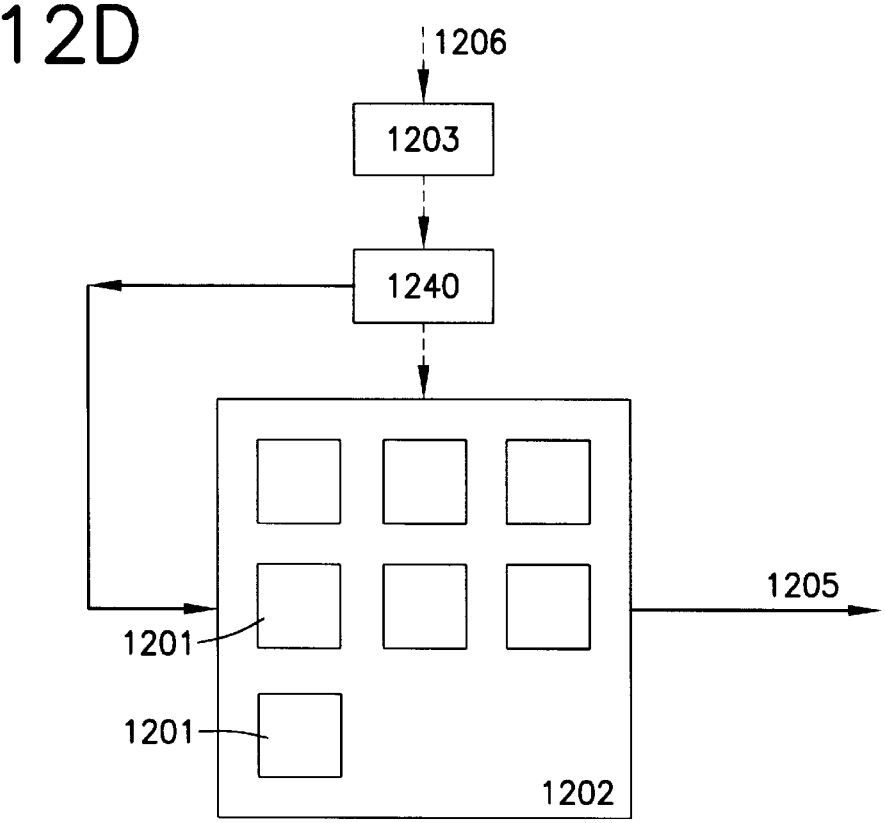
FIG. 12d shows another step in the data processing sequence.

FIG. 12*d* shows the next step after FIG. 12*c*.

Functional element 1202 and memories 1203, 1240 were reconfigured upon a trigger generated by the functional element or the memories or another unit and transmitted over 1206. Write memory 1231 is now configured as a read memory 1240 and delivers the data to the functional element. The results are forwarded via output bus 1205.

Figure 13:
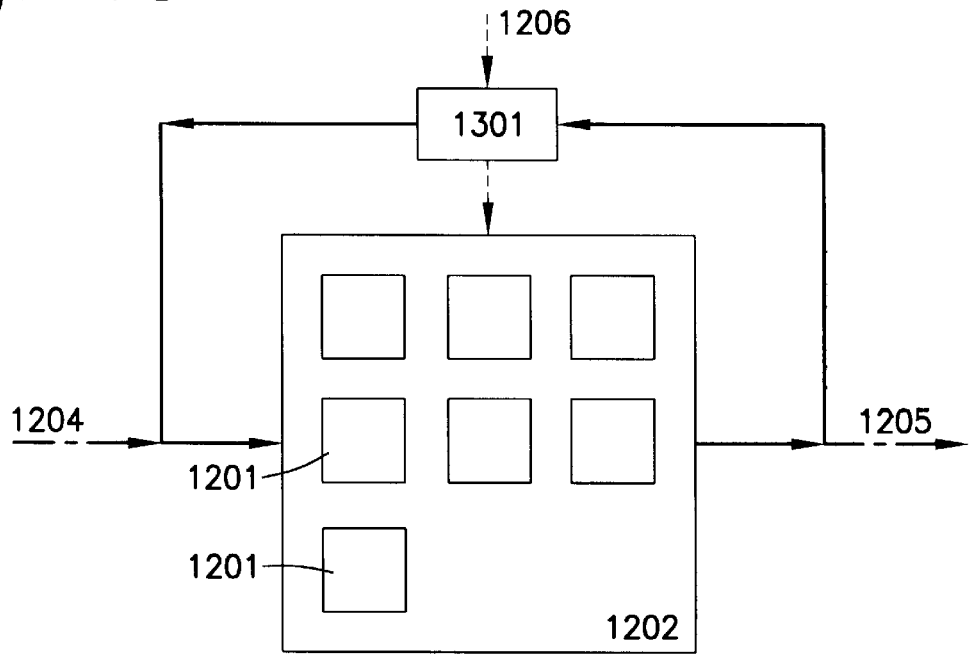
FIG. 13 illustrates the connection of a buffer with separate read/write pointers to a set of configurable elements.

FIG. 13 shows a circuit according to FIG. 12, where a memory with separate read and write pointers 1301 is used instead of the two memory arrays.

Figure 14:
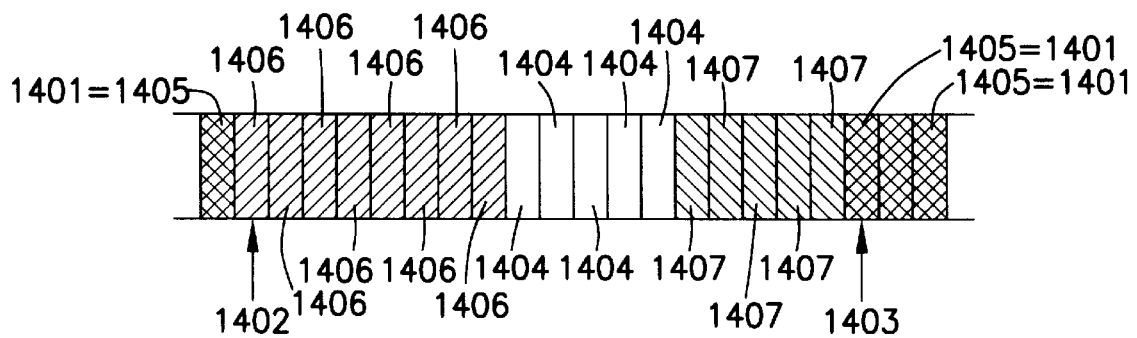
FIG. 14 illustrates the operation of a buffer with separate read/write pointers.

FIG. 14 shows memory 1401 according to FIG. 13. The record in front of read pointer 1402 has already been read or is free 1405. The pointer points to a free record. Data 1406 still to be read are located behind the read position pointer. A free area 1404 and data already re-written 1407 follow. Write position pointer 1403 points at a free record, which is either empty or already has been read. The memory can be configured as a ring memory, as described previously.

Figure 15:
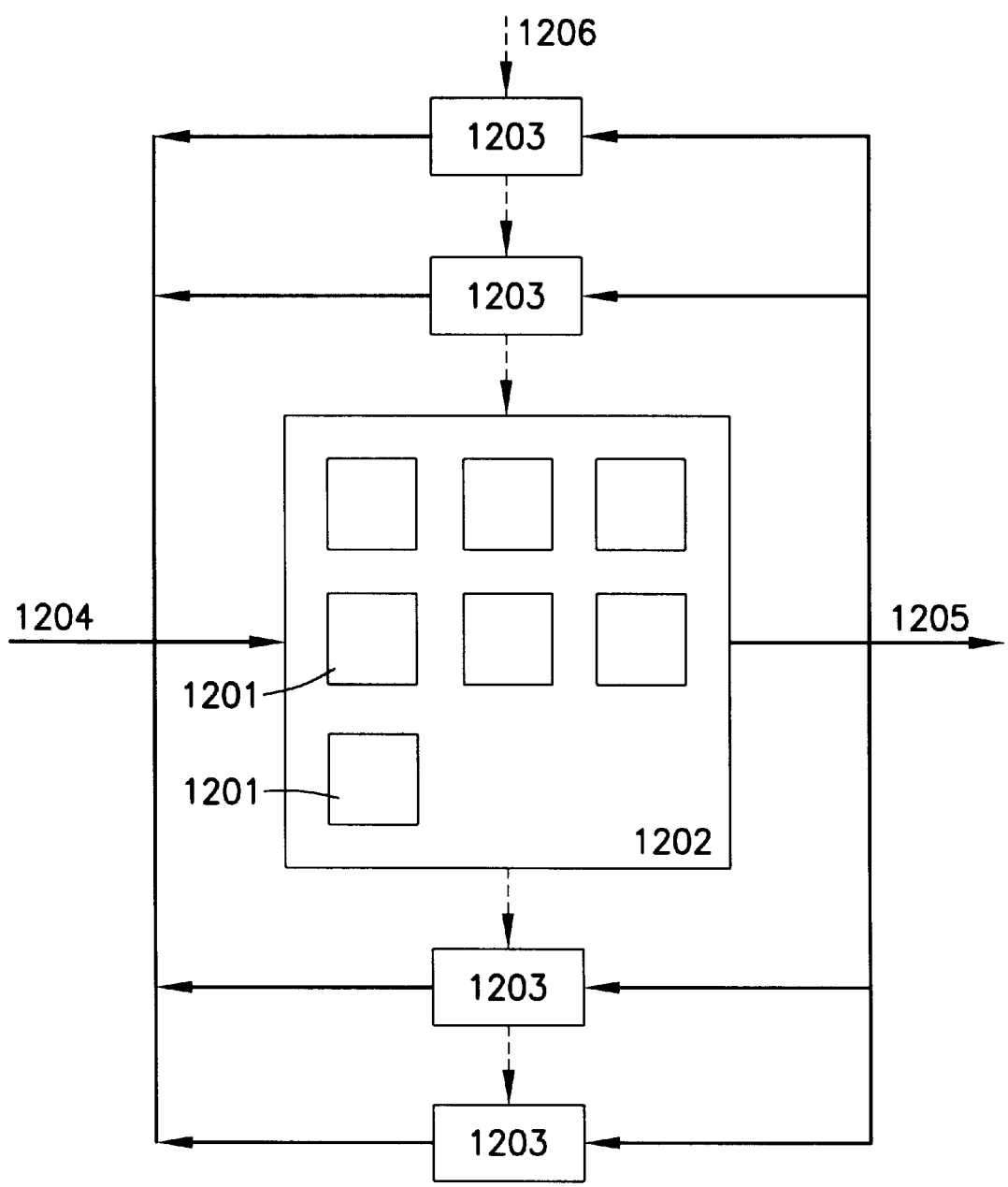
FIG. 15 illustrates the connection of two buffers each comprising two memory arrays to a set of configurable elements.

FIG. 15 shows a circuit according to FIG. 12, where both memory banks 1203 are present in duplicate. This makes it possible to store and then simultaneously process a plurality of results.

Figure 15A:
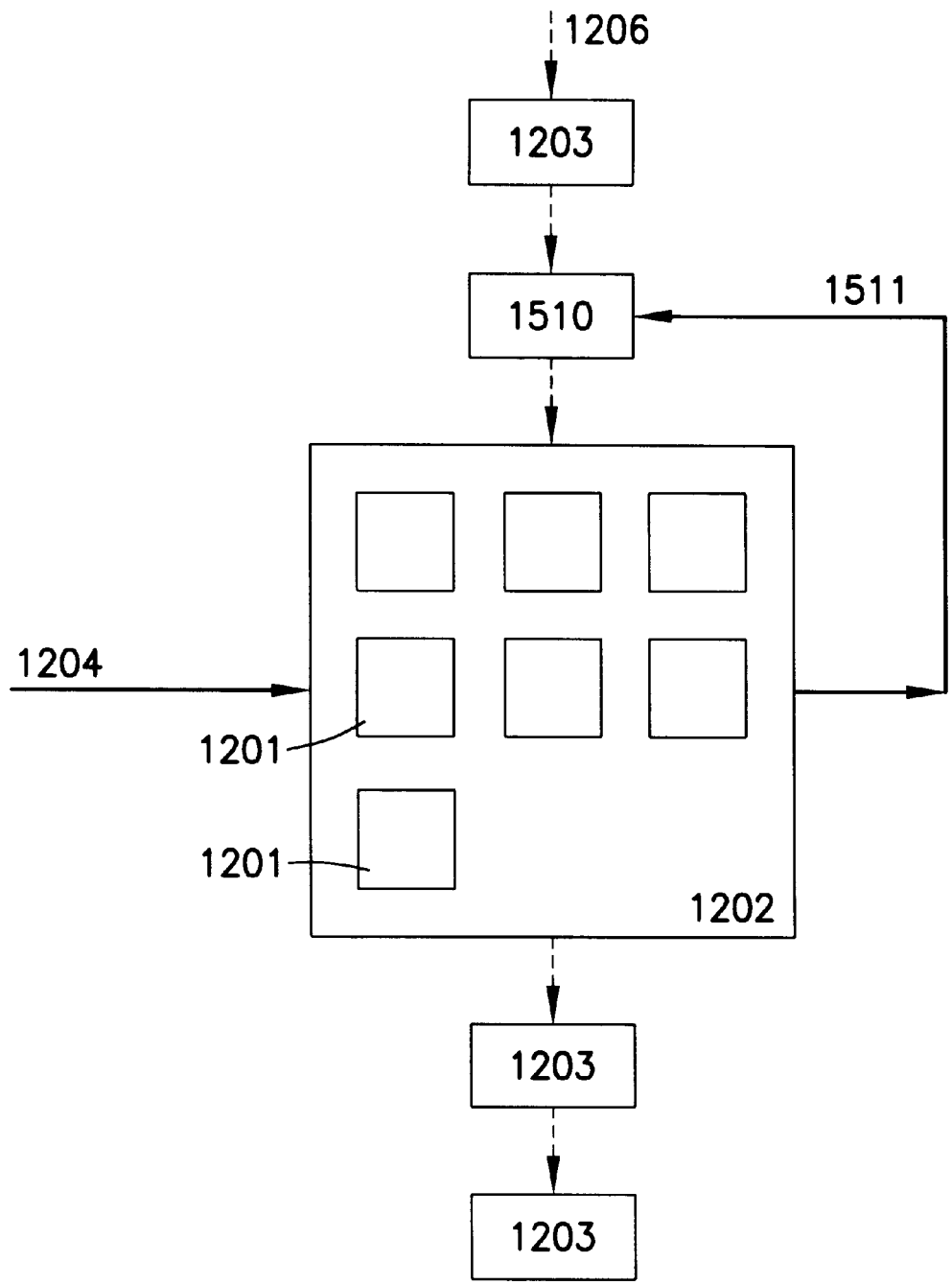
FIGS. 15a, 15b and 15c show the data processing sequence.

FIG. 15*a* shows how external data 1204, i.e., from another functional unit or from outside the unit, is computed in functional element 1202 and then written in write memory 1510 via bus 1511.

Figure 15B:
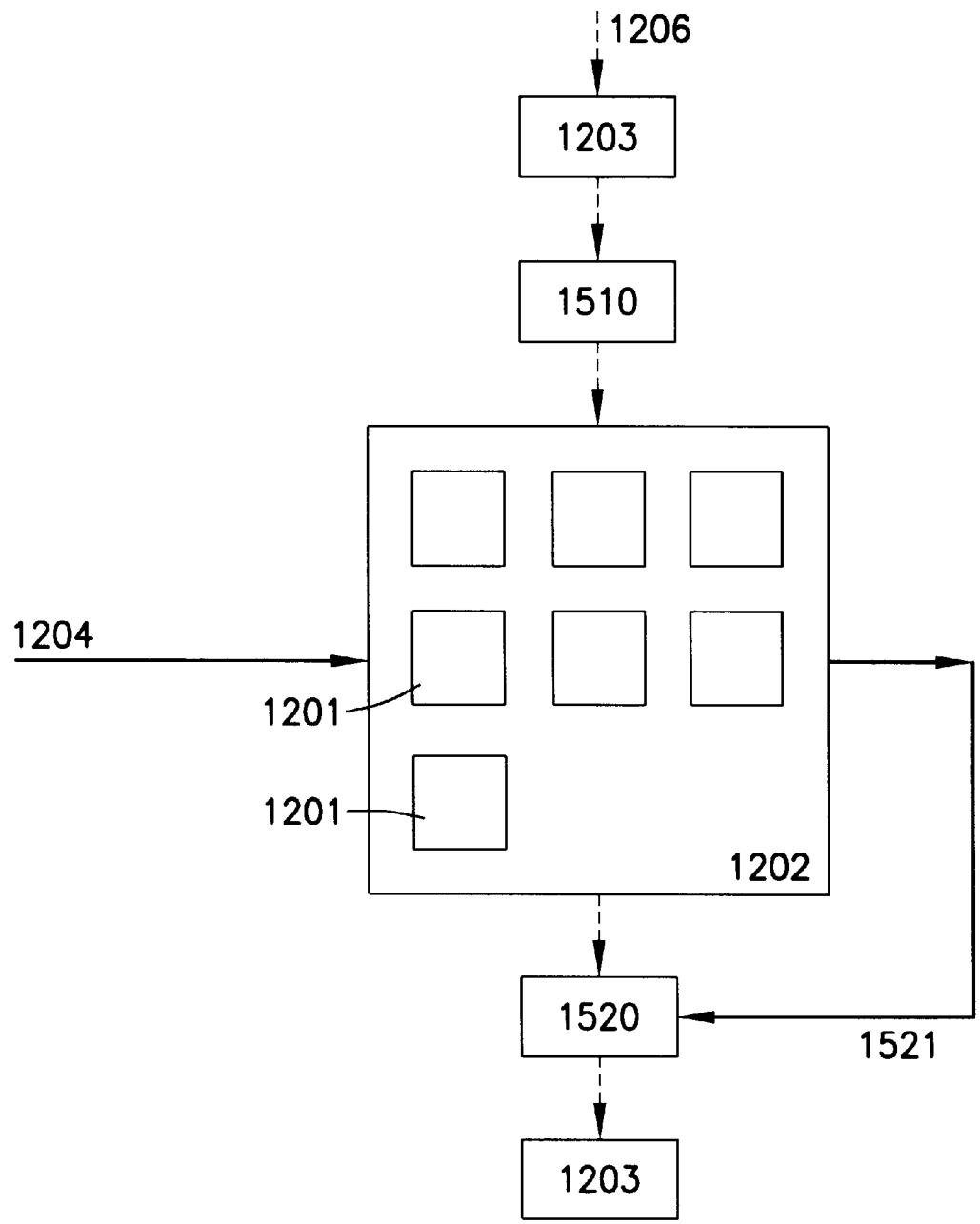

FIG. 15*b* shows the next step after FIG. 15*a*.

Functional element 1202 and memories 1203, 1510, 1520 have been reconfigured following a trigger generated by the functional element or the memories or another unit and transmitted over 1206. External data 1204, i.e., from another functional unit or from outside the unit, is computed in functional element 1202 and then written in write memory 1520 via bus 1521.

Figure 15C:
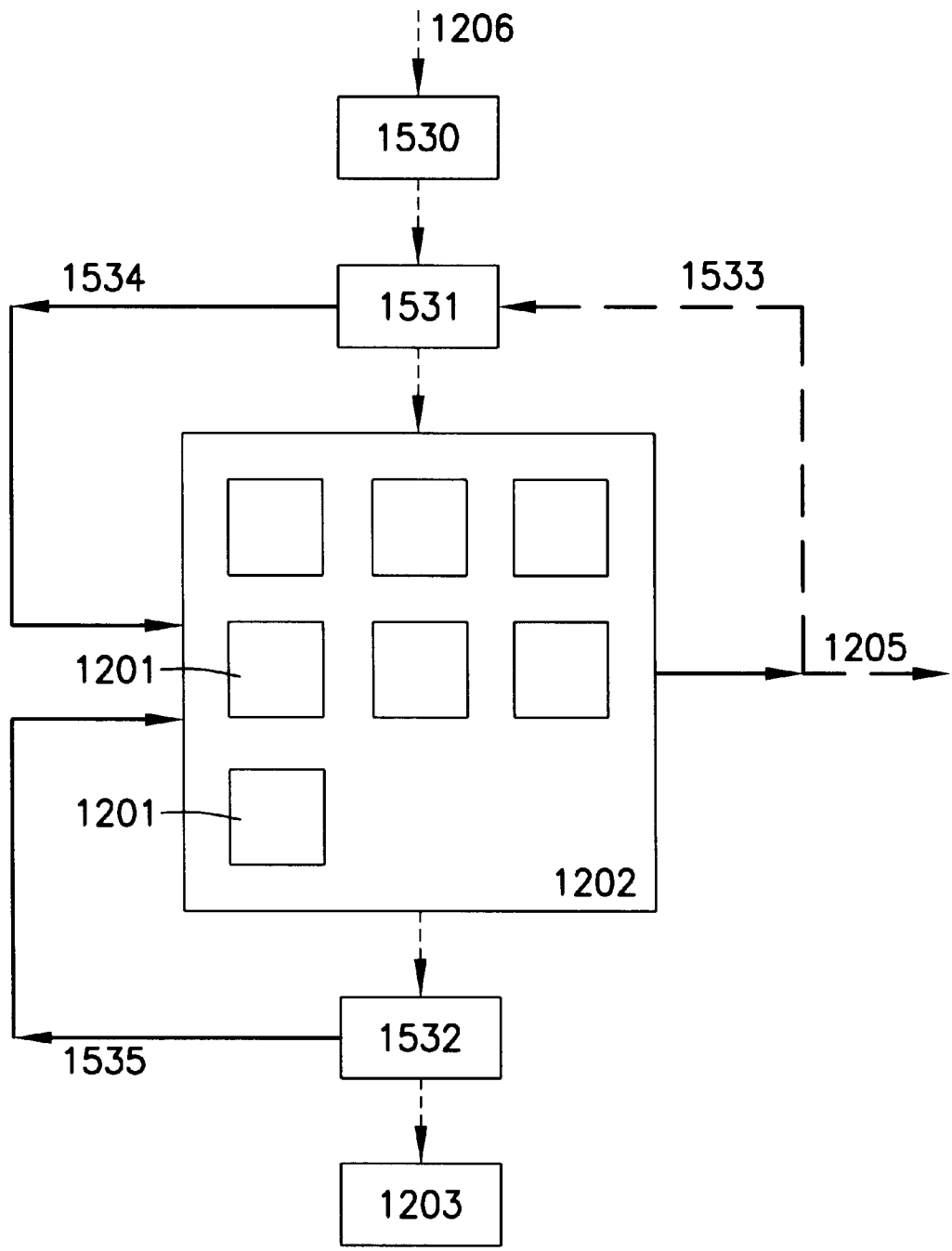

FIG. 15*c* shows the next step after FIG. 15*b*.

Functional element 1202 and memories 1203, 1530, 1531, 1532 have been reconfigured following a trigger generated by the functional element or the memories or another unit and transmitted over 1206. Write memories 1510, 1520 are now configured as read memories 1531, 1532 and deliver several operands simultaneously to functional elements 1202. Each read memory 1531, 1532 is connected to 1202 via an independent bus system 1534, 1535. The results are either stored in write memory 1530 via 1533 or forwarded via 1205.

| | Glossary |
|---|---|
| ALU | Arithmetic Logic Unit. Basic unit for data processing. The unit can perform arithmetic operations such as addition, subtraction, and occasionally also multiplication, division, expansions of series, etc. The unit can be configured as an integer unit of a floating-point unit. The unit can also perform logic operations such as AND, OR, as well as comparisons. |
| data string | A data string is a series of bits, of any length. This series of bits represents a processing unit for a system. Both commands for processors or similar components and data can be coded in a data string. |
| DFP | Data flow processor according to German Patent No. DE 44 16 881. |
| DPGA | Dynamically Configurable FPGAs. Related art. |
| D Flip-Flop | Memory element, which stores a signal at the rising edge of a cycle. |
| EALU | Expanded Arithmetic Logic Unit, ALU which has been expanded to perform special functions needed or convenient for the operation of a data processing device according to German Patent Application No. DE 441 16 881 A1. These are, in particular, counters. |
| Elements | Generic concept for all enclosed units used as a part in an electronic unit. Thus, the following are defined as elements:<br>• configurable cells of all types<br>• clusters<br>• RAM blocks<br>• logics<br>• arithmetic units<br>• registers<br>• multiplexers<br>• I/O pins of a chip |
| Event | An event can be analyzed by a hardware element in any manner suitable for the application and trigger an action as a response to this analysis. Thus, for example, the following are defined as events:<br>• clock pulse of a CPU<br>• internal or external interrupt signal<br>• trigger signal from other elements within the unit<br>• comparison of a data stream and/or a command stream with a value<br>• input/output events<br>• run, overrun, reset of a counter<br>• analysis of a comparison |
| flag | Status bit in a register showing a status. |
| FPGA | Programmable logic unit. Related art. |
| gate | Group of transistors that performs a basic logic function. Basic functions include NAND, NOR. Transmission gates. |
| configurable element | A configurable element represents a component of a logic unit, which can be set for a special function using a configuration string. Configurable elements are therefore all types of RAM cells, multiplexers, arithmetic logic units, registers, and all types of internal and external interconnecting units, etc. |

-continued

Glossary

| | |
|---|---|
| configure | Setting the function and interconnections of a logic unit, an FPGA cell or a PAE (see reconfigure). |
| configuration data | Any set of configuration strings. |
| configuration memory | The configuration memory contains one or more configuration strings. |
| configuration string | A configuration string consists of a series of bits, of any length. This bit series represents a valid setting for the element to be configured, so that an operable unit is obtained. |
| PLU | Unit for configuring and reconfiguring the PAE. Constituted by a microcontroller designed specifically for this purpose. |
| latch | Memory element that usually relays a signal transparently during the H level and stores it during the L level. Latches where the level function is reversed are used in some PAEs. Here an inverter is normally connected before the cycle of a normal latch. |
| read position pointer | Address of the current record for read access within a FIFO or a ring memory. |
| logic cells | Cells used in DFPs, FPGAs, and DPGAs, performing simple logic and arithmetic functions, depending on their configuration. |
| oversampling | A clock runs with a frequency that is a multiple of the base clock, synchronously with the same. The faster clock is usually generated by a PLL. |
| PLL | Phase Locked Loop. Unit for generating a multiple of a clock frequency on the basis of a base clock. |
| PLU | Units for configuring and reconfiguring the PAE. Constituted by a microcontroller specifically designed for this purpose. |
| ring memory | Memory with its own read/write position pointer, which-upon reaching the end of the memory-is positioned at the beginning of the memory. An endless ring-shaped memory is thus obtained. |
| RS flip-flop | Reset/Set flip-flop. Memory element that can be switched by two signals. |
| write position pointer | Address of the current record for write access within a FIFO or ring memory. |
| State-Back unit | Unit that controls the feedback of status signals to the PLU, comprising a multiplexer and an open-collector bus driver element. |
| switching table | A switching table is a ring memory, which is addressed by a controller. The records of a switching table may contain any configuration strings. The controller can execute commands. The switching table responds to trigger signals and reconfigures configurable elements using a record in a ring memory. |
| gate | Switch that forwards or blocks a signal. Simple comparison: relay. |
| reconfigure | New configuration of any number of PAEs, while any remaining number of PAEs continue their functions (see configure) |
| processing cycle | A processing cycle describes the time required by a unit to go from a specific and/or valid state into the next specific and/or valid state. |
| state machine | Logic that can assume different states. The transition between the states depends on different input parameters. These machines are used for controlling complex functions and correspond to the related art. |
| Conventions | |
| Naming conventions | |
| unit | -UNIT |

-continued

Glossary

| | |
|---|---|
| mode | -MODE |
| multiplexer | -MUX |
| negated signal | not- |
| register visible to PLU | -PLUREG |
| internal register | -REG |
| shift register | -sft |
| Function conventions | |
| shift | registersft |
| AND function | & |

| A | B | Q |
|---|---|---|
| 0 | 0 | 0 |
| 0 | 1 | 0 |
| 1 | 0 | 0 |
| 1 | 1 | 1 |

OR function#

| A | B | Q |
|---|---|---|
| 0 | 0 | 0 |
| 0 | 1 | 1 |
| 1 | 0 | 1 |
| 1 | 1 | 1 |

NOT function!

| A | Q |
|---|---|
| 0 | 1 |
| 1 | 0 |

GATE functionG

| EN | D | Q |
|---|---|---|
| 0 | 0 | - |
| 0 | 1 | - |
| 1 | 0 | 0 |
| 1 | 1 | 1 |

What is claimed is:

1. A method for dynamically reconfiguring a configurable unit, the configurable unit including a plurality of configurable elements and having a multidimensional cell arrangement, the method comprising the steps of:

storing in a configuration memory configuration strings, a position pointer pointing to a first configuration string of the configuration strings;

detecting an event;

moving the position pointer to point to a second configuration string of the configuration strings as a function of the detected event;

transmitting the second configuration string to at least one of the plurality of configurable elements;

receiving, by the at least one of the plurality of configurable elements, the transmitted configuration string; and reconfiguring by the at least one of the plurality of configurable elements as a function of the received configuration string.

2. The method of claim 1, further comprising the steps of:
transmitting, by a configuration unit, the configuration string for storage in the configuration memory; and
transmitting, by a controller, feedback signals to the configuration unit, the controller controlling the configuration memory.

3. The method of claim 1, wherein the event is a clock pulse.

4. The method of claim 1, wherein the event is a trigger signal.

5. The method of claim 1, wherein the event is an external interrupt.

6. The method according to claim 1, wherein the step of reconfiguring the at least one of the plurality of reconfigurable cells occurs simultaneously while at least another of the plurality of reconfigurable cells processes data.

7. A method for dynamically reconfiguring a configurable unit, the configurable unit including configurable elements and having a multidimensional cell arrangement, the method comprising the steps of:
storing in a configuration memory a configuration string, a position pointer into the configuration memory being maintained by a controller;
detecting events;
translating at least one of the detected events to an address in the configuration memory;
transmitting the configuration string from the address in the configuration memory to at least one of the configurable elements;
receiving, by the at least one of the configurable elements; and
reconfiguring by the at least one of the configurable elements as a function of the received configuration string; and
moving the position pointer in response to the detection of the event.

8. A method for dynamically reconfiguring a configurable unit, the configurable unit including a plurality of configurable elements and having a multidimensional cell arrangement, the method comprising the steps of:
storing in a table configuration strings;
detecting an event;
transmitting a selected one of the configuration strings from the table to at least one of the plurality of configurable elements in response to the detection of the event, the selected one of the configurations strings being selected as a function of the detected event;
receiving, by the at least one of the plurality of configurable elements, the transmitted configuration string; and
changing a configuration of the at least one of the plurality of configurable elements as a function of the received configuration string.

9. The method according to claim 8, further comprising the steps of:
maintaining a pointer, the pointer pointing to a first one of the configuration strings in the table;
moving the pointer to point to a second one of the configuration strings in the table; and
selecting the selected one of the configuration strings from the table as a function of a position in the table to which the pointer is pointing.

10. The method according to claim 8, wherein the changing of the configuration step occurs simultaneously while at least another of the plurality of configurable cells processes data.

11. The method according to claim 8, wherein the event is a timing signal.

12. A method for dynamically reconfiguring a configurable unit, the configurable unit including a olurality of configurable elements and having a multidimensional cell arrangement, comprising the steps of:
storing in a table configuration strings;
detecting an event;
transmitting a selected at least one of the configuration strings from the table to at least one of the plurality of configurable elements in response to the detection of the event, the at least one of the configurations strings being selected as a function of the detected event;
receiving, by the at least one of the plurality of configurable elements, the transmitted configuration string;
reconfiguring the at least one of the plurality of configurable elements as a function of the received configuration string; and
arbitrating the event so that only one event is detected at a time.

13. A method for dynamically reconfiguring a configurable unit, the configurable unit including a plurality of configurable elements and having a multidimensional cell arrangement, comprising the steps of:
storing in a table configuration strings;
detecting an event;
transmitting a selected at least one of the configuration strings from the table to at least one of the plurality of configurable elements in response to the detection of the event, the at least one of the configurations strings being selected as a function of the detected event;
receiving, by the at least one of the plurality of configurable elements, the transmitted configuration string;
reconfiguring the at least one of the plurality of configurable elements as a function of the received configuration string; and
masking the event so that only an enabled event is recognized.

14. A method for dynamically reconfiguring a configurable unit, the configurable unit including a plurality of configurable elements and having a multidimensional cell arrangement, the method comprising the steps of:
storing in a table configuration strings, the table including a plurality of records having a plurality pointers, each of the Plurality of pointers pointing to at least one of the plurality of records;
detecting an event;
transmitting a selected at least one of the configuration strings from the table to at least one of the plurality of configurable elements in response to the detection of the event, the at least one of the configurations strings being selected as a function of the detected event;
receiving, by the at least one of the plurality of configurable elements, the transmitted configuration string;
reconfiguring the at least one of the plurality of configurable elements as a function of the received configuration string; and
changing at least one of the plurality of pointers to point to a different one of the plurality of records as a function of a trigger signal.

15. A method for dynamically reconfiguring a configurable unit, the configurable unit including a plurality of configurable elements and having a multidimensional cell arrangement, comprising the steps of:

storing in a table configuration strings, the table including a plurality of records having a plurality pointers, each of the plurality of pointers pointing to at least one of the plurality of records;

detecting an event;

transmitting a selected at least one of the configuration strings from the table to at least one of the plurality of configurable elements in response to the detection of the event, the at least one of the configurations strings being selected as a function of the detected event;

receiving, by the at least one of the plurality of configurable elements, the transmitted configuration string;

reconfiguring the at least one of the plurality of configurable elements as a function of the received configuration string; and controlling by a state machine at least one of the pointers.

16. The method according to claim 15, further comprising the step of:

receiving by the state machine a first command, the state machine maintaining a predefined state until an occurrence of a predefined event as a function of the first command.

17. The method according to claim 15, further comprising the step of:

receiving a first command, the state machine controlling the at least one of the pointers to point to a preselected one of the plurality of records as a function of the first command.

18. The method according to claim 15, further comprising the step of:

receiving a first command, the state machine incrementing the at least one of the plurality of pointers to point to one of the plurality of records positioned at a predefined distance relative to a current record, the predefined distance being a function of the first command.

19. The method according to claim 15, further comprising the step of:

receiving a first command, the state machine controlling the at least one of the pointers to point to a preselected one of the plurality of records after detecting a preselected number of events in response to the first command.

20. The method according to claim 15, further comprising the step of:

receiving a first command and generating a feedback signal as a function of the first command.

21. The method of claim 15, further comprising the step of:

transmitting a feedback signal by the configuration unit to at least one of the plurality of configurable elements.

22. The method of claim 15, further comprising the steps of:

receiving a first command; and generating a feedback signal to a hierarchical higher controller as a function of the first command.

23. A system for dynamically reconfiguring a configurable unit, the configurable unit having a multidimensional cell arrangement, the configurable unit including a plurality of configurable elements, comprising:

a configuration memory coupled to the configurable unit, the configuration memory storing configuration strings;

a controller controlling the configuration memory, the controller transmitting a selected one of the configuration strings to at least one of the plurality of configurable elements in response to an event, wherein the at least one of the plurality of configurable elements reconfigures as a function of the transmitted configuration string; and a configuration unit storing the configuration strings in the configuration memory.

24. The system of claim 23, wherein the controller transmits at least one feedback signal, the configuration unit receiving and analyzing the transmitted at least one feedback signal.

25. The system of claim 23, wherein the configuration unit further stores a command in the configuration memory, the controller executing the command.

26. The system of claim 23, wherein the configuration memory is a ring memory, the controller maintaining at least one of a read pointer and a write pointer into the ring memory.

27. The system of claim 23, wherein the event is a clock signal.

28. The method of claim 23, wherein the event is a trigger signal.

29. The method of claim 23, wherein the event is an external interrupt.

30. The system according to claim 23, wherein the first event is a first timing signal and the second event is a second timing signal.

31. The system according to claim 23, wherein the controller maintains a pointer into the configuration memory, the controller moving the pointer in response to the event, the one of the configuration strings being selected as a function of the pointer.

32. A system for processing data, comprising:

a configurable unit having a multidimensional architecture, the configurable unit including a plurality of configurable elements, each of the plurality of configurable elements processing data, determining result data, and providing a trigger signal after determining the result data;

a memory coupled to at least one of the plurality of configurable elements, the at least one of the plurality of configurable elements storing the result data in the memory; and a configuration unit coupled to the at least one of the plurality of configurable elements, the configuration unit receiving the trigger signal and reconfiguring the at least one configurable element as a function of the receipt of the trigger signal.

33. The system according to claim 32, wherein the memory is a ring buffer.

34. A method for processing data in a reconfigurable unit, the reconfigurable unit including a plurality of reconfigurable elements in a multidimensional arrangement, comprising the steps of:

assigning a first memory to at least one of the plurality of reconfigurable elements;

processing data by the at least one of the plurality of reconfigurable elements processing data;

determining a first result data, by the at least one of the plurality of reconfigurable elements, as a function of the processing step;

storing the first result data, by the at least one of the plurality of reconfigurable elements, into the assigned first memory;

transmitting, by the at least one of the plurality of reconfigurable elements, a trigger signal;

receiving, by a configuration unit, the trigger signal;

reconfiguring the at least one of the plurality of reconfigurable elements as a function of the receipt of the trigger signal; and processing, by the reconfigured at least one of the plurality of reconfigurable element, the stored first result data.

35. The method of claim 34, further comprising the step of:

reconfiguring, by the configuration, the first memory.

36. The method of claim 34, wherein the first memory is a FIFO having a FULLFLAG, the FULLFLAG being the trigger signal.

37. The method of claim 34, further comprising the steps of:

operating the first memory as a read memory during a first time; and operating the first memory as a write memory during a second time.

38. The method of claim 34, further comprising the step of:

operating the first memory as a read memory and a write memory simultaneously.

39. The method of claim 34, wherein the first memory is a ring buffer.

40. The method of claim 34, wherein the first memory has a depth, the method further comprising the step of:

reconfiguring the depth of the first memory.

41. A method for processing data in a reconfigurable unit, the reconfigurable unit including a plurality of reconfigurable elements in a multidimensional arrangement, comprising the steps of:

assigning a first memory to at least one of the plurality of reconfigurable elements;

processing data by the at least one of the plurality of reconfigurable elements orocessing data;

determining a first result data, by the at least one of the plurality of reconfigurable elements, as a function of the processing step;

storing the first result data, by the at least one of the plurality of reconfigurable elements, into the assigned first memory;

transmitting, by the at least one of the plurality of reconfigurable elements, a trigger signal;

receiving, by a configuration unit, the trigger signal;

reconfiguring the at least one of the plurality of reconfigurable elements as a function of the receipt of the trigger signal;

processing, by the reconfigured at least one of the plurality of reconfigurable element, the stored first result data;

processing, by at least another one of the plurality of reconfigurable elements, other data;

determining a second result data, by the at least another one of the plurality of reconfigurable elements, as a function of the processing step; and storing the second result data in the assigned first memory.

42. A method for processing data in a reconfigurable unit, the reconfigurable unit including a plurality of reconfigurable elements in a multidimensional arrangement, comprising the steps of:

assigning a first memory to at least one of the plurality of reconfigurable elements;

processing data by the at least one of the plurality of reconfigurable elements processing data;

determining a first result data, by the at least one of the plurality of reconfigurable elements, as a function of the processing step;

storing the first result data, by the at least one of the plurality of reconfigurable elements, into the assigned first memory;

transmitting, by the at least one of the plurality of reconfigurable elements, a trigger signal;

receiving, by a configuration unit, the trigger signal;

reconfiguring the at least one of the plurality of reconfigurable elements as a function of the receipt of the trigger signal;

processing, by the reconfigured at least one of the plurality of reconfigurable element, the stored first result data;

processing, by at least another one of the plurality of reconfigurable elements, other data;

assigning a second memory to the at least another one of the plurality of reconfigurable elements;

storing the second result data in the assigned second memory; and transmitting the stored second result data to the first memory.

43. The method according to claim 1, wherein the step of moving the position pointer includes the step of skipping a third configuration string in the configuration memory, the third configuration string being positioned between the first configuration string and the second configuration string.

44. A method for dynamically reconfiguring a configurable unit, the configurable unit including configurable elements and having a multidimensional cell arrangement, the method comprising the steps of:

storing in a configuration memory configuration data;

detecting an event;

selecting a portion of the configuration data as a function of the event, the selected portion being less than all of the configuration data stored in the configuration memory;

transmitting the selected portion of the configuration data to at least one of the configurable elements;

receiving, by the at least one of the configurable elements, the transmitted selected portion of the configuration data; and reconfiguring by the at least one configurable elements as a function of the received selected portion of the configuration data.

45. The method according to claim 44, wherein the reconfiguring step occurs simultaneously while at least another of the configurable elements processes data.

46. The method according to claim 44, wherein the selected portion of the configuration data includes a first portion of the configuration data in response to detecting a first event, and a second portion of the configuration data in response to detecting a second event, the first portion of the configuration data being different from the second portion of the configuration data.

47. A method for dynamically reconfiguring a configurable unit, the configurable unit including configurable elements and having a multidimensional cell arrangement, the method comprising the steps of:

storing in a configuration memory configuration data;

maintaining a position pointer, the position pointer pointing into the configuration memory;

detecting events;

moving the position pointer as a function of the detecting step;

selecting a portion of the configuration data as a function of at least one of the detected events, the selected portion being less than all of the configuration data stored in the configuration memory;

transmitting the selected portion of the configuration data to at least one of the configurable elements;

receiving, by the at least one of the configurable elements, the transmitted selected portion of the configuration data; and reconfiguring by the at least one configurable elements as a function of the received selected portion of the configuration data.

48. The method according to claim 47, wherein the reconfiguring step occurs simultaneously while at least another of the configurable elements processes data.

49. A method for dynamically reconfiguring a configurable unit, the configurable unit including a plurality of configurable elements and having a multidimensional cell arrangement, the method comprising the steps of:

storing in a table configuration strings;

pointing a pointer to a first one of the configuration strings;

transmitting the first one of the configuration strings to a first at least one of the configurable elements;

reconfiguring by the at least one of the configurable elements as a function of the first one of the configuration strings;

detecting an event;

moving the point to point to a second one of the configuration strings as a function of the event;

transmitting the second one of the configuration strings to the at least one of the plurality of configurable elements; and reconfiguring by the at least one of the plurality of configurable elements as a function of the second one of the configuration strings.

* * * * *